Sept. 29, 1942.   J. D. LEWIS ET AL   2,297,359
ELEVATOR CONTROL SYSTEM
Filed March 29, 1941   7 Sheets-Sheet 2

Jacob Daniel Lewis
William Henry Bruns   } INVENTORS
BY  Matthew B. Bradley   ATTORNEY Sept. 29, 1942.  J. D. LEWIS ET AL  2,297,359
ELEVATOR CONTROL SYSTEM
Filed March 29, 1941  7 Sheets-Sheet 3
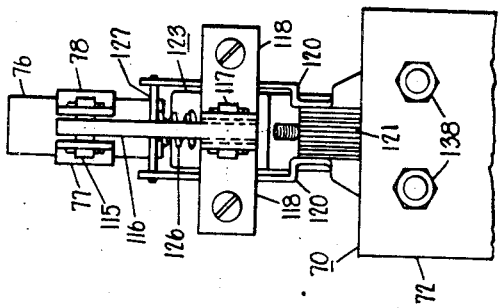
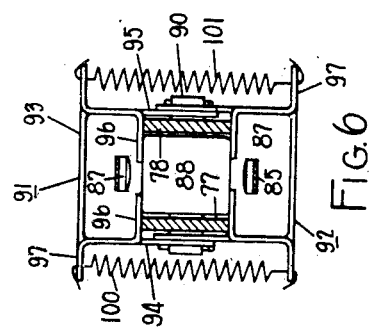
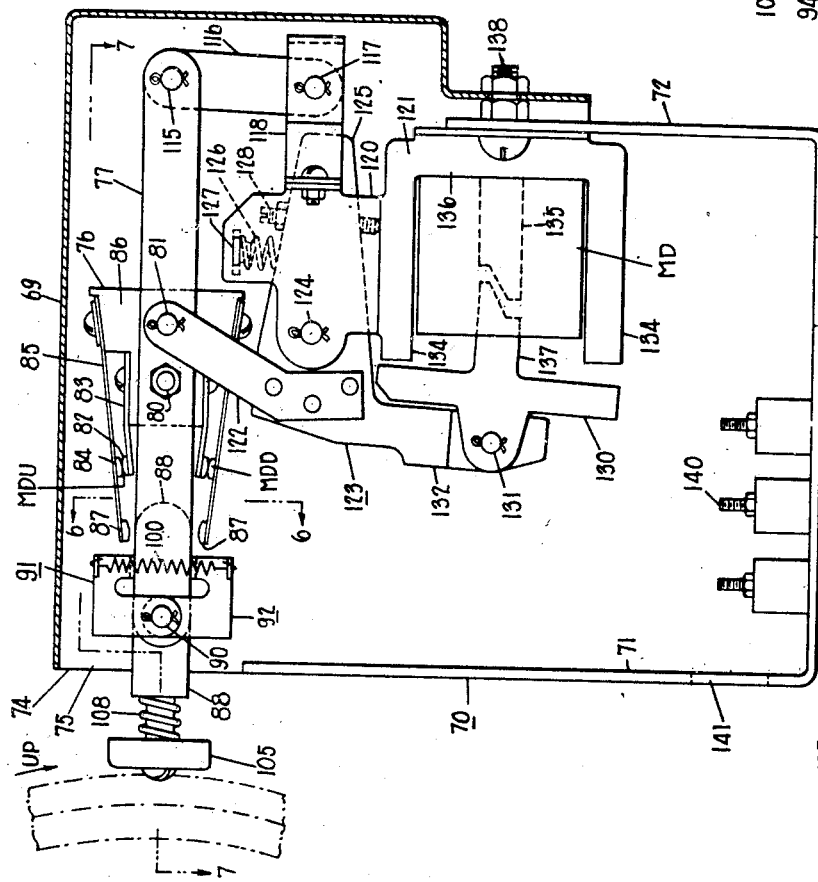
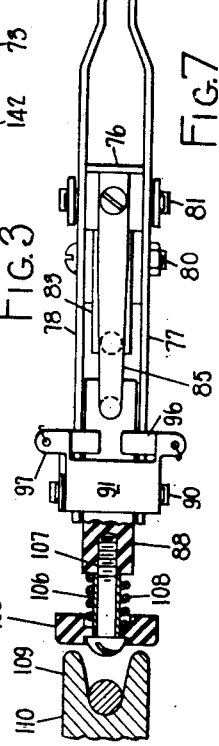
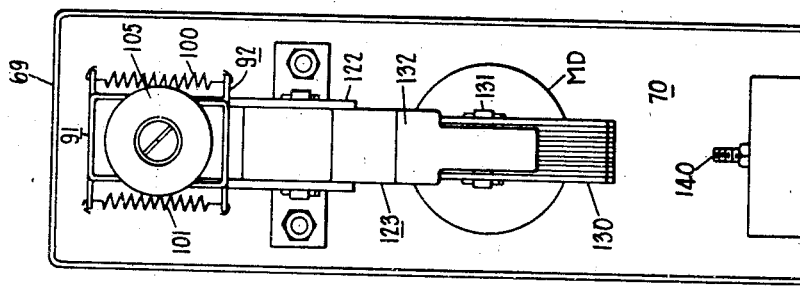

Patented Sept. 29, 1942

2,297,359

UNITED STATES PATENT OFFICE 2,297,359

ELEVATOR CONTROL SYSTEM

Jacob Daniel Lewis, Yonkers, and William Henry Bruns, Lincolndale, N. Y., assignors to Otis Elevator Company, New York, N. Y., a corporation of New Jersey Application March 29, 1941, Serial No. 385,790

27 Claims. (Cl. 187—29)

The invention relates to the control of elevators having electric hoisting motors whose available torque may be controlled, such as polyphase alternating current motors.

In slower speed elevator installations, various factors are important in determining the equipment which will be installed. With polyphase alternating current power supply to the building, a polyphase alternating current hoisting motor may be used or a direct current hoisting motor may be employed and supplied with power from a variable voltage direct current generator driven by a polyphase alternating current motor. Variable voltage installations may readily be controlled to effect smooth and accurate stops at the landings. However, the cost of such an installation is in excess of that of one in which an alternating current hoisting motor is employed and in many installations cost is a predominant factor. In installations employing polyphase alternating current hoisting motors, whether single speed or multi speed, the speed of the car is considerably affected by load. Thus in stopping, especially in cases where the stopping is automatic, the accuracy of the stop and the time consumed in making the stop are affected by load. Also, where mechanism is provided for automatically bringing the car to the landing level, in case it underruns or overruns the floor, load affects the levelling operation and as a consequence it has been the practice to employ at least for the levelling operation a motor whose speed is low enough to enable levelling to be readily effected.

It is an object of the invention to determine in an inexpensive and effective manner the load on the elevator hoisting motor and to utilize such determination in compensating for the effect of such load in stopping the elevator car at a landing.

Another object of the invention is to control the available torque of the elevator hoisting motor in accordance with the load on the motor for the operation of levelling the car with a landing.

The invention is especially applicable to elevator installations employing single speed polyphase alternating current hoisting motors and will be described as applied to such an installation. In carrying out the invention according to the arrangement which will be described, resistance is provided for controlling the torque of the motor. In starting the car, this resistance is short-circuited in timed steps. The instant at which the car starts depends upon the load on the motor. Thus, in lowering full load, for example, the car may start as soon as power is applied to the motor and the brake released, whereas in lifting full load, nearly all of the resistance may be short-circuited to build up a high torque before the car will start. Mechanism is provided for registering the load on the motor, determined by the amount of resistance which has been short-circuited by the time the car has moved a certain short distance in starting. This measurement of load is utilized to control the application of the electromechanical brake for the stopping operation. With automatic stopping, as the car arrives at a fixed distance from the floor at which a stop is to be made, the supply of power to the motor is discontinued and the brake is applied. The force with which the brake is applied is governed by the load measurement and is such as to provide a stronger braking action, the less the net load on the motor, so as to bring the car to a stop substantially level with the landing.

With levelling mechanism provided, in case the car when brought to a stop has underrun or overrun the floor, the circuit for the motor is established to bring the car to the landing level and the motor resistance is short-circuited in timed steps until the car starts and runs a certain distance. No further resistance is short-circuited and just before the car reaches the exact landing level the supply of power to the motor is discontinued and the brake is fully applied, bringing the car to an immediate stop. Thus the load is measured and the motor is permitted to develop only enough torque to bring the car to the landing level at a low rate of acceleration, thereby minimizing any tendency for the car to overrun the landing in effecting the levelling operation.

A certain time is provided after the initiation of the stopping operation to determine whether a levelling operation is to take place. In case the levelling mechanism does come into operation, a certain additional time interval is allowed for the levelling operation to be effected. This added time is ample to bring the car to the floor level if the system is properly adjusted. Should the system be out of adjustment so that the levelling is not completed within this added interval, the levelling operation is discontinued and the car is brought to a stop as the time interval expires. This is preferably combined with automatic door opening operation. If the stop is sufficiently accurate so that levelling will not take place, the door is automatically opened upon the expiration of the interval provided to determine whether or not levelling will take place. Should the levelling mechanism come into operation and the levelling be effected before the added time interval expires, the door starts to open as soon as the levelling is completed. However, in case the levelling has not been effected within this extended interval, it is discontinued and the door is automatically opened.

The torque controlling resistance is arranged in series with each phase of the hoisting motor stator winding. In short-circuiting this resistance, it is done in one phase at a time. This minimizes the number of contacts on the accelerating switches.

A general idea of the invention, the mode of carrying it out which is at present preferred, and various features and advantages thereof will be gained from the above statements. Other features and advantages of the invention will be apparent from the following description and appended claims.

In the drawings:

Figure 3 is a side view with parts in section of a motion device utilized in the system illustrated in Figure 1;

Figure 4 is a front view of the same with parts in section;

Figure 5 is a rear view of the same with the cover removed and parts broken away;

Figure 6 is an enlarged sectional detail taken along the line 6—6 of Figure 3;

Figure 7 is a sectional detail taken along the line 7—7 of Figure 3;

Figure 8A:
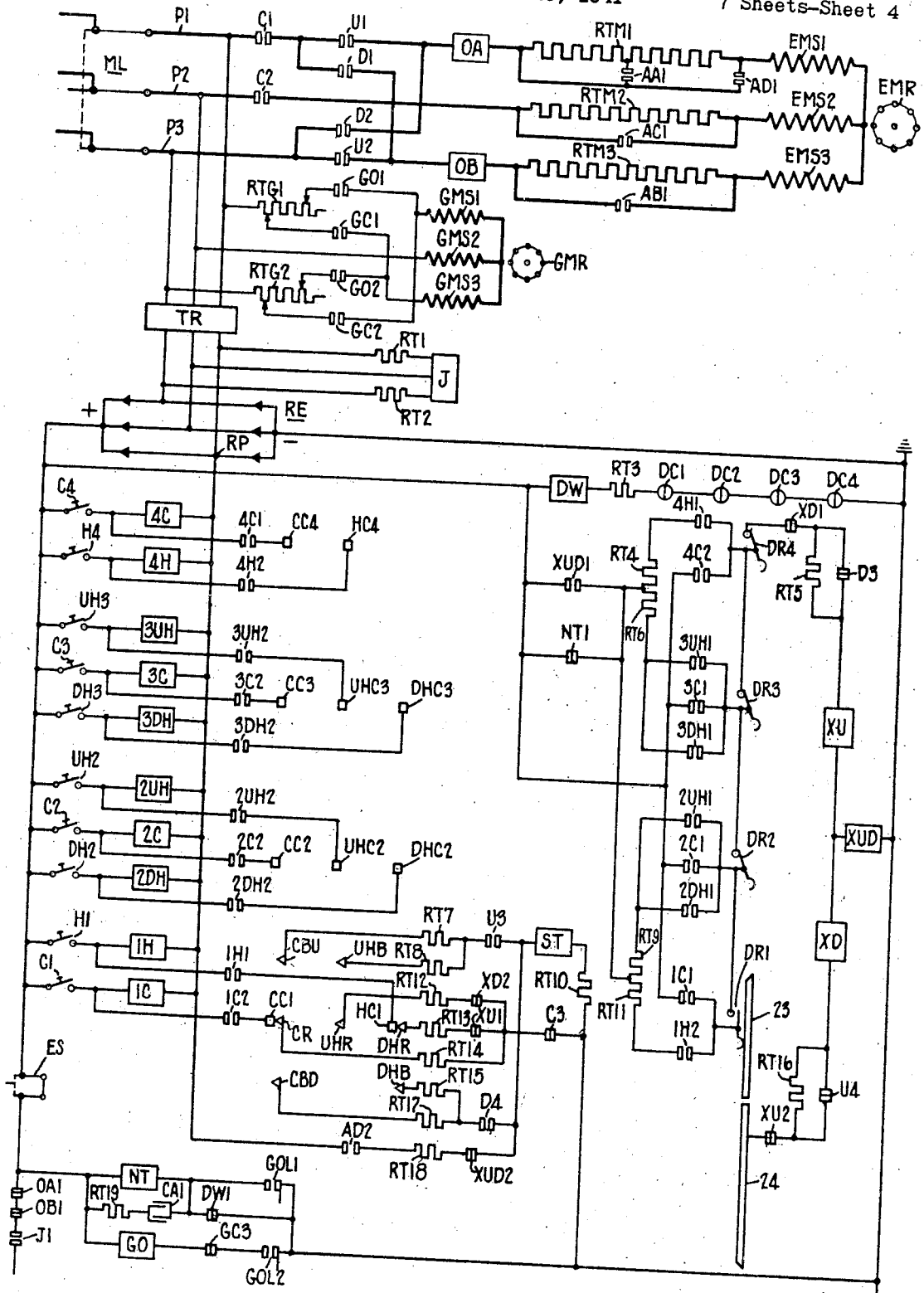
Figure 8A:
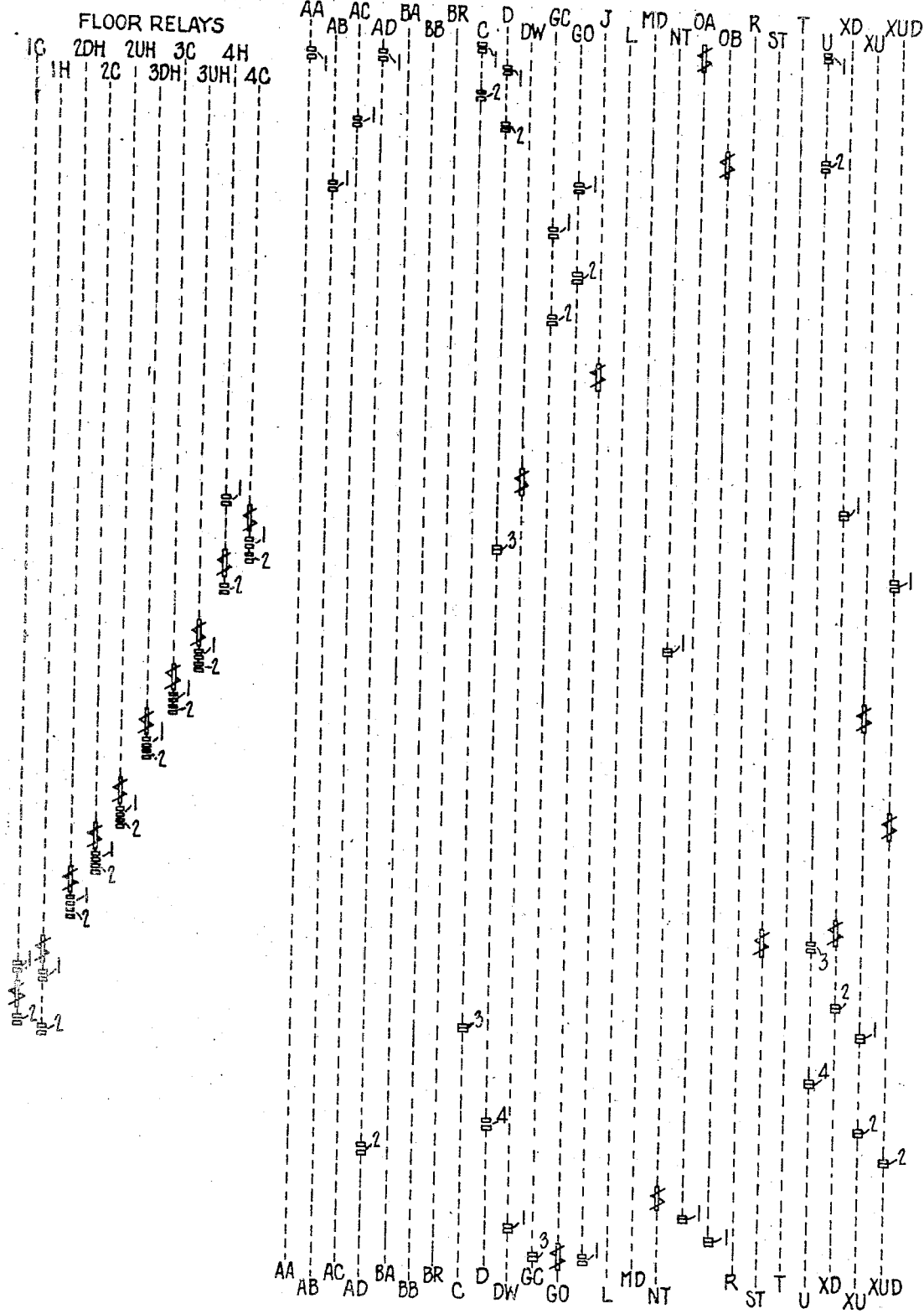
Figure 8B:
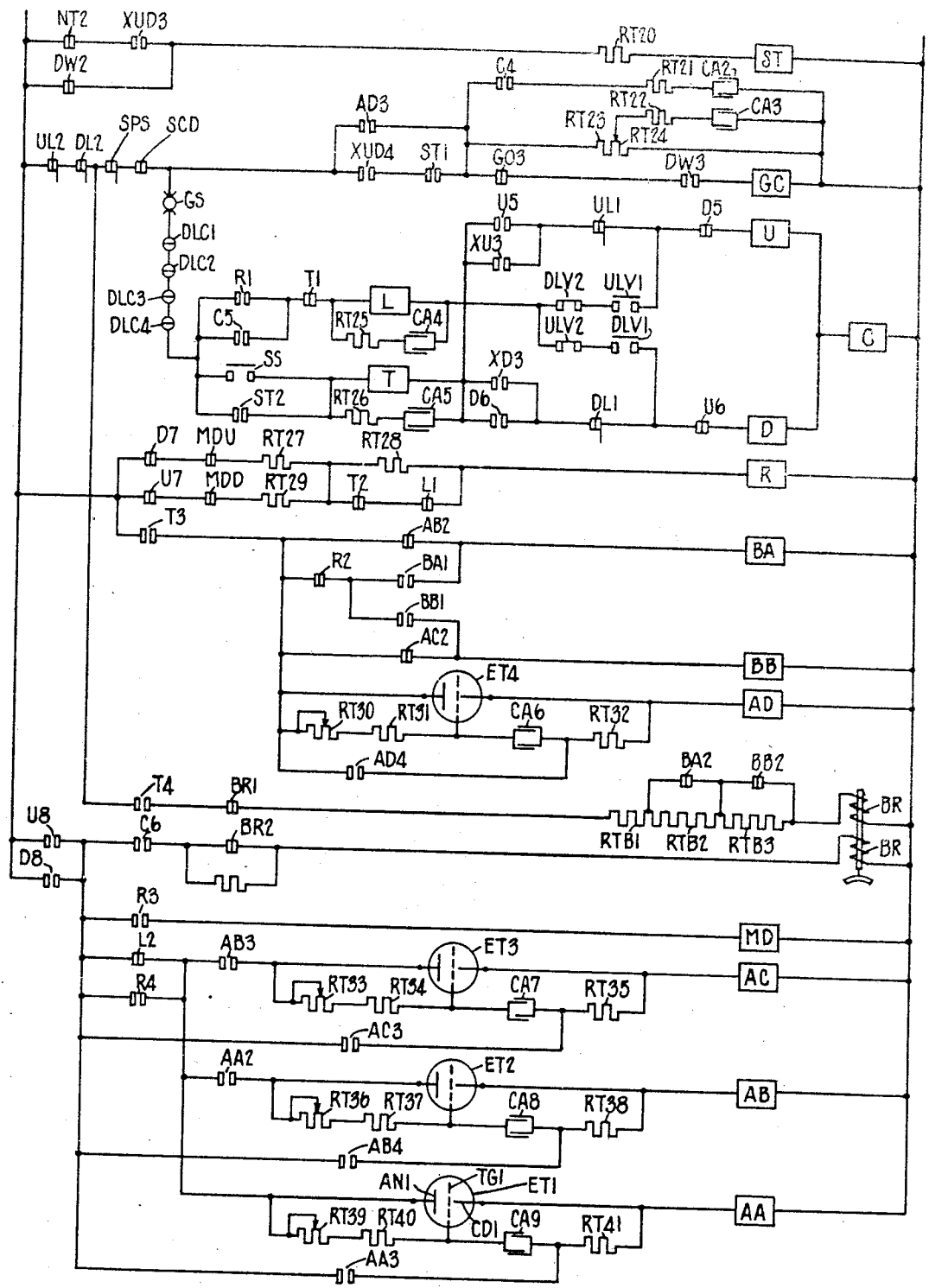
Figure 8B:
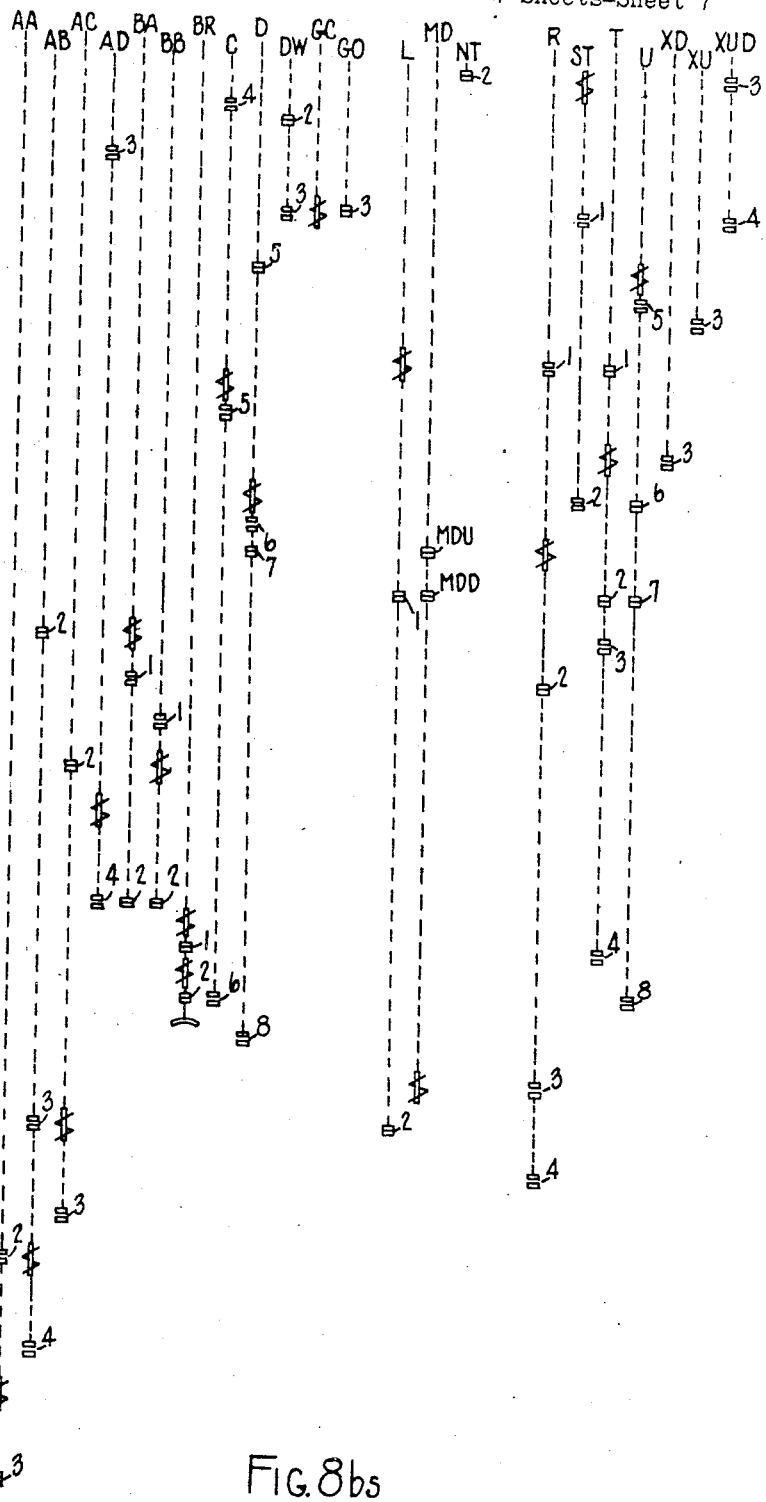

Figures 8a and 8b constitute a simplified wiring diagram of an elevator control system chosen to illustrate the principles of the invention; and Figures 8as and 8bs are key sheets for Figures 8a and 8b respectively, showing the electromagnetic switches in spindle form with the contacts and coils arranged on the spindles in horizontal alignment with the corresponding contacts and coils in the wiring diagram.

Figure 1:
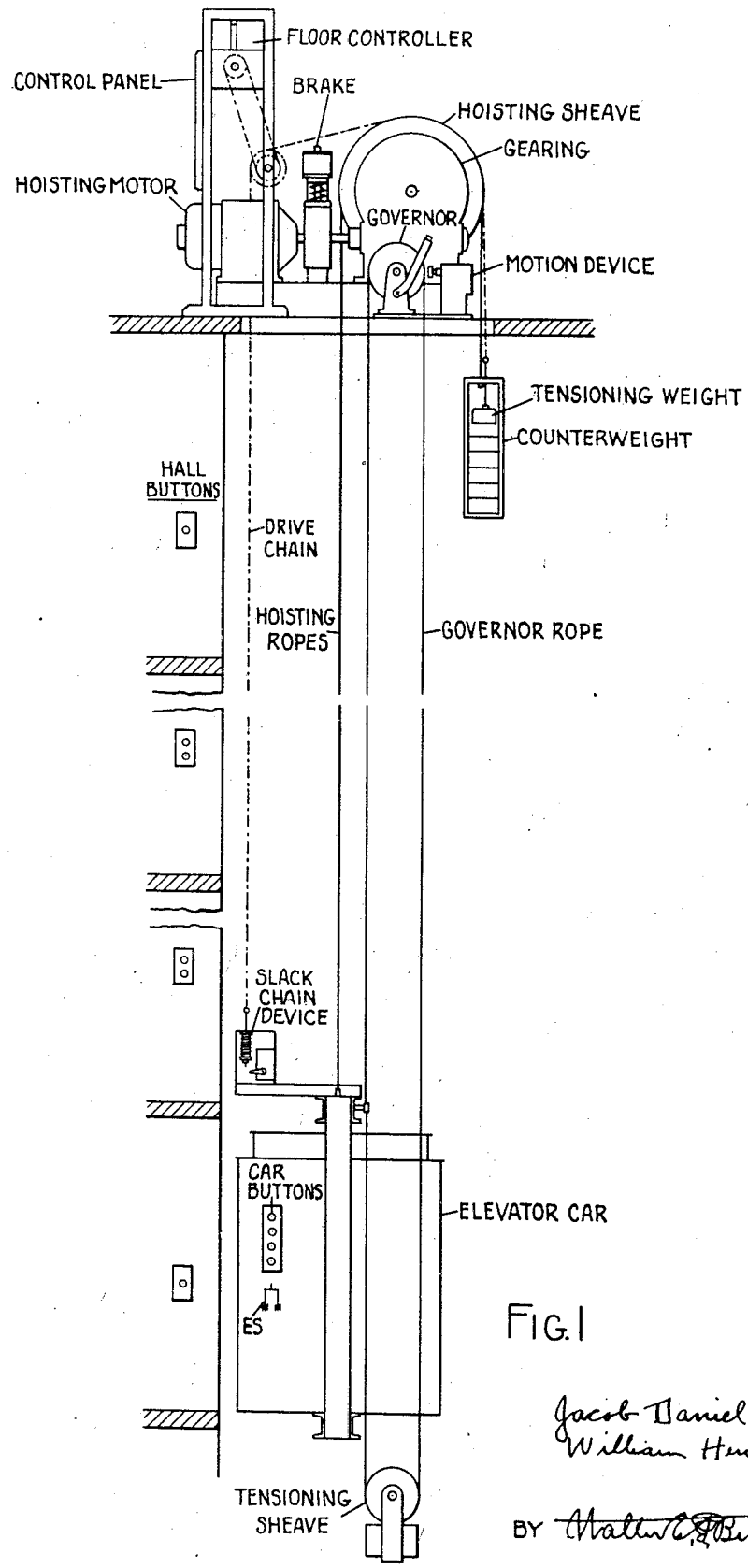
Figure 1 is a simplified schematic representation of an elevator installation embodying the invention.

Referring first to Figure 1, wherein various parts are indicated by legend, the elevator car is suspended by hoisting ropes which extend upwardly from the car around the hoisting sheave and downwardly to the counterweight. A geared machine is illustrated in which the hoisting sheave is driven by the hoisting motor through a worm and worm gear reduction. The brake is electromechanical, being spring applied and electromagnetically released. The brake shoes are applied to a brake sheave arranged on the motor shaft.

A motion device is utilized to register when the car starts. This device is illustrated as operated by the car governor. This governor has been illustrated as of the type disclosed in the patent to Hymans No. 2,001,361. It is driven by a governor rope attached to the elevator car framework and passing at the bottom around a tensioning sheave to maintain the rope taut.

The invention is especially applicable to systems in which the slow down and stopping of the car at the various floors is automatic. There are various types of elevator control in which automatic slow down and stopping are utilized. In the type illustrated, the pressing of a push button either in the car or at a landing starts the car in a direction toward the floor for which the push button is provided. The car is slowed down and stopped at landings for which push buttons have been pressed, and is automatically restarted after each stop so long as push buttons remain to be responded to.

A four floor installation is illustrated. A push button is provided in the car for each of the floors. Also, a push button is provided at the first and fourth floors and an up push button and a down push button are provided both at the second and third floors. The push buttons act through floor relays to register calls and the floor relays in turn act through a floor controller to control the operation of the car. The floor controller is illustrated as driven from the car by a sprocket chain which passes from the car upwardly to and over a sprocket wheel on the floor controller drive shaft and from there over the hoisting sheave in a special groove provided thereon and down to a tensioning weight in the counterweight frame. The connection of the drive chain to the elevator car is effected through a slack chain device. This device is provided with a spring which acts, upon a predetermined amount of slack developing in the chain or the chain becoming broken, to move a trip on the end of the chain to engage an operating lever for switching mechanism. Operation of this switching mechanism prevents further operation of the car until this slack is taken up or the broken chain repaired. The floor relays and electromagnetic switches of the control system are mounted on a control panel, in turn mounted on the front of the floor controller framework. The floor controller framework is illustrated as straddling the hoisting motor.

Figure 2:
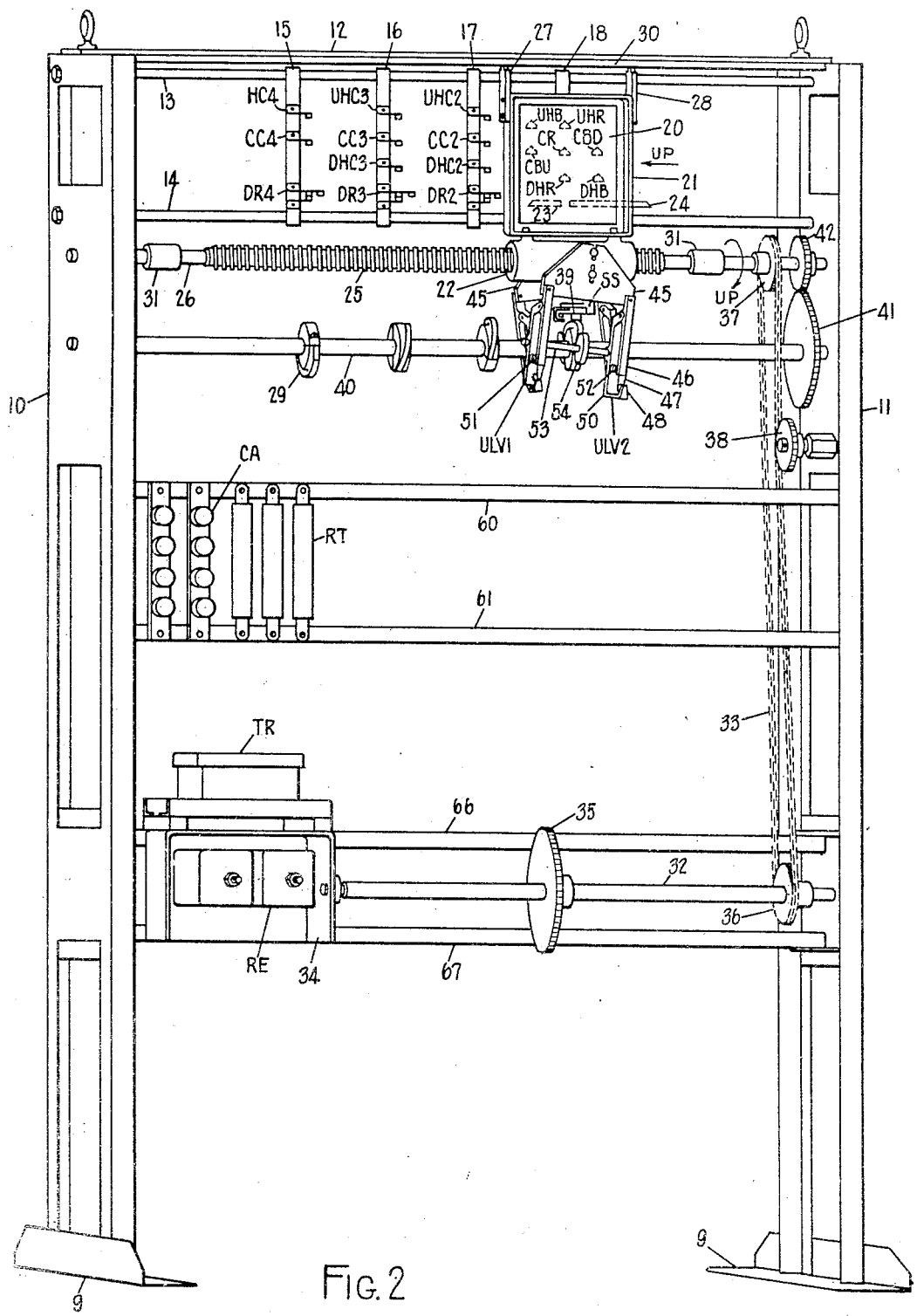
Figure 2 is a schematic representation as viewed from the rear of a floor controller employed in the system illustrated in Figure 1.

Referring now to Figure 2, the floor controller framework comprises a pair of side frames 10 and 11, joined at the top by a top plate 12 and at other points by various horizontal members, which will be referred to later. Feet 9 are secured to the bottoms of the side frames for mounting the floor controller. Horizontal members 13 and 14 at the top of the floor controller framework act as supports for a plurality of floor bars 15, 16, 17 and 18, one for each of the floors. These floor bars extend vertically and are secured to cross members 13 and 14 in horizontal spaced relation in accordance with the distance between the floors for which they are provided. Arranged on these floor bars are stationary contacts rendered effective by the floor relays. There are three stationary contacts for each intermediate floor and two for each terminal floor. Those in the upper row are subject to the up hall buttons and hall button at the top floor and are designated UHC2, UHC3 and HC4 for the second, third and fourth floors respectively. Those in the bottom row are subject to the down hall buttons and hall button at the first floor and are designated HC1, DHC2 and DHC3 for the first, second and third floors respectively. Those in the middle row are subject to the car buttons and are designated CC1, CC2, CC3 and CC4 for the first, second, third and fourth floors respectively. Contacts CC1 and HC1 are obscured in Figure 2 but appear in the wiring diagram of Figure 8a.

These stationary contacts are engaged by contact brushes arranged on a panel 20 carried by a frame 21 secured to a horizontally travelling crosshead 22. Two brushes are provided for engaging the stationary contacts controlled by the up hall buttons, a leading brush UHB and a following brush UHR. Similarly, two brushes are provided for engaging the stationary contacts controlled by the down hall buttons, a leading brush DHB and a following brush DHR. Three brushes are provided for engaging the contacts controlled by the car buttons, an up leading brush CBU, a down leading brush CBD and an intermediate brush CR. The leading brushes engage their respective stationary contacts as the car arrives at a certain distance from the floors for which the stationary contacts are provided while the following and intermediate brushes are in engagement with these contacts when the car is stopped at these floors. Also on panel 20 is a direction cam arranged in two sections 23 and 24. This cam cooperates with direction switches, one for each floor, subject to the floor relays and arranged on the floor bars to control the direction of car travel. These direction switches are designated DR1, DR2, DR3 and DR4 for the first, second, third and fourth floors respectively, switch DR1 being obscured by panel 20.

The crosshead 22 is in the form of a split nut with threads only in the middle portion thereof. This nut is driven by a screw 25 on a horizontal shaft 26 supported at its ends in bearings arranged in the side frames 10 and 11. The crosshead frame 21 at the upper end carries guides 27 and 28 which extend into a trough 30 secured to top plate 12 to guide the panel 20 with respect to the floor bars upon rotation of shaft 26. Shaft 26 has on each end thereof a collar 31 to support the crosshead upon overtravel.

Shaft 26 is driven from the floor controller drive shaft 32 by a sprocket chain 33. The drive shaft is supported in bearings, one in side frame 11 and the other in a frame 34 which will be referred to later. The sprocket secured to shaft 32, which is driven by the chain attached to the elevator car, is designated 35. Another sprocket 36 is secured to shaft 32 for driving chain 33. This chain extends upwardly around a sprocket 37 secured to shaft 26. An idler sprocket 38 is adjustably secured to side frame 11 to maintain sprocket chain 33 taut.

A stopping switch SS is carried by the crosshead. This switch is arranged beneath the crosshead and has a pair of normally engaged contacts, the movable one being carried on the tip of contact spring 39. This switch is operated by a plurality of cams 29, one for each floor. The cams are secured on a horizontal shaft 40 in spaced relation in accordance with the distance between floors. This shaft extends crosswise of the framework and is supported at its ends in bearings in side frames 10 and 11. Shaft 40 is driven from shaft 26 by reduction gearing formed by gears 41 and 42. The cams 29 are helical cams with the pitch and direction of the helix in accordance with the movement of the crosshead. The contact spring carries a contacting piece for engaging the cams. The contact spring is arranged at an angle corresponding to the pitch of the cams. When the car arrives at a certain distance from the floor at which a stop is to be made, the cam 29 for that floor engages the contacting piece of the stopping switch to separate the switch contacts. This causes the car to slow down and come to a stop in a manner which will be described later.

Where levelling mechanism is provided for bringing the car to an exact landing level, in case it overruns or underruns the floor, this mechanism may be arranged on the floor controller and is so illustrated. Also the mechanism is illustrated as utilizing cams 29 as both stopping cams and levelling cams. The mechanism has two pairs of switches carried by the crosshead, one pair on each side of the crosshead. Each pair of switches is mounted on a bracket 45, these brackets being adjustably secured to the crosshead, one on each side thereof. Each pair of switches is of the same construction. Each switch comprises a base 46 secured to the bracket at one edge thereof to extend downwardly therefrom. A spring contact 47 is mounted on the base. This contact is engaged by a movable contact 48 on a lever 50 pivoted on base 46. One of the switches of each pair which makes the circuit for the coil of a direction switch has making contacts and is biased to open position by a spring 51. These switches are designated ULV1 and DLV1 for the up and down directions of operation respectively. The other switches have breaking contacts and are biased to closed position by springs 52. These switches serve as interlocks and are designated ULV2 and DLV2 for the up and down directions respectively.

The levers 50 of each pair of switches are connected by a rod 53 carrying a roller 54 midway between the levers. These rollers are preferably provided with rubber tires and are positioned to be engaged by cams 29 to operate the switches. The mounting brackets 45 are arranged at an angle corresponding to the pitch of the cams so as to avoid any sliding of the rollers on the cam surfaces. As the car arrives in the levelling zone for a floor, the making contacts for the direction in which the car is travelling are moved into engagement by the action of the cam for that floor on the operating roller for those contacts. At the same time, this effects the separation of the interlock contacts for that direction to prevent the energization of the coil of the direction switch for the opposite direction. As the car arrives at the floor, the cam runs off the roller and the interlock contacts engage and the making contacts separate to cause the car to come to a stop. As will be seen from a description of the wiring diagram, the levelling mechanism is not effective on an underrun unless the car stops short of the floor. Should the car overrun the floor before being brought to a stop, the cam engages the opposite roller to cause operation of the switches for the other direction. The making contacts act when the car comes to a stop to complete the circuit for the coil of the direction switch for the opposite direction to return the car to the floor while the interlock contacts prevent the energization of the coil of the direction switch for the original direction. As the car arrives at the floor, the cam runs off the roller and the making contacts separate to bring the car to a stop. This will be explained in detail later.

Secured to the side frames 10 and 11 at the rear of the floor controller are two cross bars 60 and 61. On these bars are mounted various elements utilized in the control system, such as resistances RT and condensers CA. Electronic tubes ET and condensers CA and resistances RT associated therewith are mounted on the back of the control panel. Below these cross bars are a pair of additional cross bars 66 and 67 secured to the side frames midway between the front and rear of the floor controller framework. At the left hand end of these cross bars is secured the frame 34, in which is mounted rectifier RE. Supported on the top of this frame and the top cross bar 66 is a transformer TR utilized to supply current for the coils of the electromagnetic switches and other elements of the control system.

Referring now to Figures 3, 4, 5, 6 and 7, the motion device illustrated for use in the control system is mounted on a frame 70. This frame is of a U construction having side legs 71 and 72 and a base 73. Leg 71 is longer than leg 72. The frame is provided with a cover 69, the front end 74 of which is open to provide an opening 75. Within the housing formed by the frame and its cover and at the top thereof opposite opening 75 are a pair of contacts designated MDU and MDD. These contacts are mounted on opposite sides of an insulating block 76 secured to bars 77 and 78 extending parallel with the top of the cover toward the opening 75. The block is secured to these bars by a bolt 80 and 81 extending through the bars and the block, the purpose of pin 81 being referred to later. Each of the contacts is of the same construction and comprises a stationary contact and a movable contact. The stationary contact is formed by a contact tip 82 on a contact plate 83 secured to block 76 by a screw. Contact tip 82 is engaged by a similar contact tip 84 on a contact spring 85 to form the movable contact. The contact spring is secured by a screw to a shoulder 86 formed on the block. These shoulders are arranged at converging angles so that the contact springs extend toward the bars 77 and 78.

On the end of each contact spring is an operating tip 87. These operating tips are arranged to be engaged by an operating bar 88 of insulating material pivotally mounted on a pin 90 extending between the ends of bars 77 and 78. Thus upon counterclockwise movement of the operating bar as viewed in Figure 3 its inner end engages the operating tip of the upper contact spring to open contacts MDU, whereas upon clockwise movement of the operating bar its inner end engages the operating tip of the lower contact spring to open contacts MDD.

The operating bar is provided with a centering device to return it to the neutral position illustrated between the two contact springs when the force for moving it about its pivot is discontinued. This centering device comprises a pair of lever members 91 and 92, one on each side of the operating bar, pivotally mounted on pin 90 for opposite pivotal movement. Each lever member is in the form of a U-shaped frame having a base 93 and two legs 94 and 95. These legs have oppositely disposed apertures through which the pivot pin 90 extends, the legs of the two levers being arranged in staggered relation as shown in Figure 6. A portion 96 of each leg is bent inwardly at an angle of 90° to form a stop which rests against the operating bar 88 and side bars 77 and 78. Also, portions of the base are bent outwardly oppositely at an angle of 180° to form lugs 97. A pair of tension springs 100 and 101 are provided on each side of the operating bar and are secured to and extend between lugs 97 to bias the levers into position with the stops 96 in engagement with bars 77, 78 and 88. Thus, upon counterclockwise movement of the operating bar about the pivot pin, lever 91 is swung counterclockwise about its pivot, whereas lever 92 is held with its stops against side bars 77 and 78, placing springs 100 and 101 under increased tension. Upon the force which moved operating bar 88 being discontinued, the springs act through lever 91 to force operating bar 88 back to its position in alignment with side bars 77 and 78. In a similar manner, should bar 88 be moved clockwise about its pivot, lever 92 is swung clockwise while lever 91 remains stationary, increasing the tension in the springs so that upon the force which moved operating bar 88 being discontinued, the operating bar is centered with respect to the side bars.

The outer end of operating bar 88 extends out through the opening 75 in the housing of the motion device. Secured to the outer end of this bar is a disc 105 of insulating material. This disc is slidably mounted on a sleeve 106 secured to the bar by a screw 107 extending through the sleeve. A coil spring 108 is arranged on the sleeve for biasing disc 105 into position against the head of the screw as illustrated in Figure 7. The disc is opposite the flanges 109 of the governor sheave 110 and upon the operating bar 88 being moved outwardly, the disc engages the governor sheave so that as the car starts the operating bar 88 is swung in one direction or the other about its pivot pin, depending upon the direction of rotative movement of the governor sheave. Upon upward movement of the car, the governor sheave moves operating bar 88 counterclockwise about its pivot to cause the separation of contacts MDU, whereas upon downward movement of the car, the governor sheave moves operating bar 88 clockwise about its pivot to cause the separation of contacts MDD.

Outward and inward movement of operating bar 88 to cause disc 105 to engage and disengage the governor sheave is effected through side bars 77 and 78. The inner ends of the side bars are bent together and pivotally connected through a pin 115 to supporting link 116. This link is pivotally mounted on a pin 117 supported by brackets 118 secured to extensions 120 of a magnet frame 121 mounted on leg 72 of the housing frame 70. The side bars 77 and 78 are also connected through bracket arms 122 to an armature lever 123. These bracket arms are rigidly secured to the armature lever and are conected to the side bars through pin 81, previously referred to. Armature lever 123 is pivotally mounted on a pin 124 supported by extensions 120 of magnet frame 121. This armature lever is in the form of a bell crank, one arm 125 of which is biased for clockwise movement about its pivot pin as viewed in Figure 3 by a spring 126 arranged between the arm and a stop 127 extending between the sides of extensions 120. A stop screw 128 is adjustably secured to the arm 125 to limit the clockwise movement of the lever. An armature 130 is pivotally mounted on a pin 131 carried by the other arm 132 of the armature lever. This armature is adapted for attraction by a magnet to pull the armature lever counterclockwise about its pivot pin 124 as viewed in Figure 3. This magnet comprises the magnet frame 121 which is of a U construction and has a magnet coil MD arranged between the legs 134 of the frame on a core 135 which extends into the coil from the base 136. The end of this core is beveled to correspond with the bevel on the movable core 137 formed on armature 130 to provide the desired magnetic action. The base of the magnet frame is secured to housing leg 72 by bolts 138, these bolts also serving to secure cover 69 to the housing frame.

With this arrangement, upon energization of magnet coil, armature lever 123 is pulled counterclockwise about its pivot, forcing bars 77 and 78 to the left as viewed in Figure 3. This moves disc 105 into engagement with the flanges 109 of the governor sheave, spring 108 yielding to permit disc 105 to slide back on its sleeve upon further movement of the bars after engagement of the disc with the governor sheave takes place. The magnet coil is energized prior to the starting of the car so that disc 105 is in engagement with the governor sheave when the car starts. Upon the starting of the car the governor sheave acts as above described to swing operating bar 88 about its pivot to effect separation of one or the other of the motion device contacts. As soon as this separation takes place, the magnet coil is deenergized and spring 126 forces armature lever 123 clockwise about its pivot to move bars 77 and 78 to the right, disengaging disc 105 from the governor sheave. Thereupon the centering device acts to return operating bar 88 into position in alignment with side bars 77, 78 to effect the reengagement of the motion device contacts. The purpose of this arrangement will be seen from a description of operation in connection with the wiring diagram, which will be given later.

The connections to the contacts of the motion device are effected through the screws which connect the contact elements to insulating block 76. Binding posts 140 are secured to the base of the housing for effecting the connections for the motion device in the control systems, the incoming wires being led to the binding posts through an aperture 141 in leg 71. The base 73 of the housing is provided with elongated slots 142 to admit screws for securing the motion device to the base of the governor.

Reference may now be had to Figures 8a and 8b, which taken together illustrate the various control and power circuits. The circuits of Figure 8b continue from the circuits of 8a. The circuits are shown in "straight" or "across the line" form, in which the coils and contacts of the electromagnetic switches are separated in such manner as to render the circuits as simple and direct as possible. The relationship of these coils and contacts may be seen from Figures 8as and 8bs where the switches are arranged in alphabetical order and shown in spindle form. The positions of these coils and contacts in the wiring diagram may be found by referring to Figures 8as and 8bs where the coils and contacts are positioned on the spindles in horizontal alignment with the corresponding elements of the wiring diagram. The floor relays are also shown in spindle form in Figure 8as where they are arranged in a separate group. The direction switches and stationary contacts of the floor controller are shown in vertical columns and for convenience the stationary contacts controlled by the car buttons are shown on the left.

The push buttons are designated in accordance with the floors for which they are provided and their location, and in the case of the push buttons at the intermediate floors in accordance with their direction. For example, C3 designates the car button for the third floor, while UH2 designates the up hall button at the second floor. The floor relays through which the push buttons act to register calls are designated in accordance with the floors and push buttons for which they are provided. For example 4H designates the floor relay for hall button H4 at the fourth floor, while 2C designates the floor relay for car button C2 for the second floor. Each relay which has been operated remains in operated condition thereby permitting the push buttons to be released. When the call is answered the floor relay is reset. Various forms of floor relays may be utilized, the one illustrated being of the type which is held in operated condition by residual magnetism. A floor relay of this type is described in the patent of Lewis, Waters and Glaser No. 2,101,146, granted December 7, 1937, to which reference may be made.

It will be assumed that the hatchway doors are manually opened and biased to closed position. The door contacts closed when the doors are closed are designated DC, while the door lock contacts which are closed only when the doors are closed and locked are designated DLC. It will be further assumed that the car gate is of the solid door type and that the gate is power operated as for example by the operating mechanism of the patent to Dunn, No. 2,121,906, granted June 28, 1938, the retiring cam of this mechanism operating the door locks. The contacts closed by the car gate in closed position are designated GS. In the system illustrated the gate operating motor is operated from the polyphase alternating current supply mains P1, P2 and P3, the rotor of this motor being designated GMR and the stator windings GMS1, GMS2 and GMS3. RTG1 and RTG2 are resistances for controlling the torque of the door operating motor. GOL1 and GOL2 are limit switches operated by the gate as it reaches open position. The rotor of the elevator hoisting motor is designated EMR, while the stator windings are designated EMS1, EMS2 and EMS3. RTM1, RTM2 and RTM3 are resistances for controlling the torque of the hoisting motor. UL1 and DL1 are direction limit switches and UL2 and DL2 are final limit switches. SPS are the contacts of a switch operated by the car brake safety, while SCD are the contacts of the switch operated by the slack chain device of floor controller drive. ES is the emergency stop switch provided in the elevator car.

A triple-pole manually operable main line switch designated ML is provided for controlling the supply of current from the supply mains to the system. Current for the coils of the floor relays and the electromagnetic control switches is derived from alternating current supply mains. Rectifier RE is interposed between the supply mains and these switches, the rectifier being fed through transformer TR to obtain the desired value of operating voltage.

The electromagnetic switches have been designated as follows:

| | |
|---|---|
| AA | First accelerating switch |
| AB | Second accelerating switch |
| AC | Third accelerating switch |
| AD | Fourth accelerating switch |
| BA | First brake control switch |
| BB | Second brake control switch |
| C | Potential switch |
| D | Down direction switch |
| DW | Door contact switch |
| GC | Gate close switch |
| GO | Gate open switch |
| J | Reverse phase relay |
| L | Levelling relay |
| NT | Hall time switch |
| OA | Overload relay |
| OB | Overload relay |
| R | Motion relay |
| ST | Stopping relay |
| T | Stop time switch |
| U | Up direction switch |
| XD | Down direction switch relay |
| XU | Up direction switch relay |
| XUD | Up and down direction switch relay |

Throughout the description which follows, these letters will be applied to the coils of the above designated switches. Also, with reference numerals appended thereto, they will be applied to the contacts of these switches, as for example XD2. Similarly, the release coil of the electro-mechanical brake is designated BR, the contacts operated by the brake being designated BR1 and BR2. RTB1, RTB2 and RTB3 are control resistances for the brake. The electromagnetic switches are illustrated in deenergized condition. Stopping relay ST which is a latching switch, as for example of the magnetically latched type like the floor relays, is illustrated in unlatched condition.

Assume that the car is standing idle at the first floor. The floor controller circuits of Figure 8a are illustrated in accordance with this assumption. As the car is idle, the first floor hatchway door is closed but not locked and the car gate is open. Door lock contacts DLC1 and gate contacts GS are therefore both separated. Door contacts DC1, however, are in engagement. The door contacts and door lock contacts for the other floors likewise are all in engagement. Inasmuch as all door contacts are in engagement, the circuit is completed for the coil of the door contact switch DW. This switch, therefore, is operated separating contacts DW1 and DW2 and engaging contacts DW3. Thus, the coil of hall time switch NT is deenergized. It will be further assumed that the time interval of this switch has expired. Assuming that the first floor hatchway door was opened when the car was stopped at the first floor, stopping relay ST is latched in operated condition, its operating coil having been energized by the engagement of contacts DW2 due to the dropping out of switch DW when the door was opened. Also, the coil of motion relay R is energized, the circuit extending through contacts D7 and MDU and resistance RT27 paralleled by contacts U7 and MDD and resistance RT29, thence through contacts T2 and L1.

Assume now that the intending passenger at the third floor presses the third floor hall button UH3. This completes a circuit for the coil of the up third floor relay 3UH. This floor relay upon operation engages contacts 3UH1 and 3UH2. As previously set forth, the floor relay is magnetically latched in operated condition so that these contacts remain in engagement after the push button is released. Contacts NT1 of the time switch being in engagement, contacts 3UH1 complete a circuit through resistance RT6, direction switches DR3 and DR4, contacts XD1 and contacts D3 for the coils of up direction switch relay XU and up and down direction switch relay XUD. Relay XU separates interlock contacts XU2 in the circuit for the coil of down direction switch relay XD. It also separates contacts XU1, rendering the down hall following brush DHR ineffective for up car travel. It also engages contacts XU3 to prepare a circuit for the up direction switch U. Relay XUD upon operation engages contacts XUD4 to complete a circuit through limit switches UL2 and DL2, safety switch SPS, slack cable device SCD, and contacts ST1, GO3 and DW3 for the coil of gate closed switch GC.

The gate close switch GC upon operation separates interlock contacts GC3 in the circuit for the coil of gate open switch GO. It also engages contacts GC1 and GC2 completing a circuit through portions respectively of resistances RTG1 and RTG2 for the stator windings GMS of the gate operating motor. The phase rotation of the voltage thus applied to the gate operating motor causes operation of the motor to move the gate to closed position. As the gate leaves open position, gate open limit switches GOL1 an GOL2 close. Limit switch GOL2 is in the circuit for the coil of gate open switch GO so that, should anyone open the hatchway door during the gate closing operation, the deenergization of door contact switch DW and consequent separation of contacts DW3 deenergizes the coil of the gate close switch to stop the gate opening operation. The attendant engagement of contacts GC3 completes a circuit for the coil of gate open switch GO. This switch engages contacts GO1 and GO2 to reverse the operation of the gate operating motor to return the gate to open position.

The closing of limit switch GOL1 in the gate closing operation completes the circuit for the coil of hall time switch NT causing this switch to operate. The resultant separation of contacts NT1 and NT2 is without effect at this time, however, as contacts NT1 are by-passed by contacts XUD1 and as stopping relay ST is latched in operated condition. When the gate nears closed position, the door lock retiring cam lifts, locking the first floor hatchway door and closing contacts DLC1. When the gate is fully closed, gate contacts GS close. This completes a circuit for the coils of stop time switch T, up direction switch U and potential switch C. This circuit is through limit switches UL2 and DL2, switches SPS and SCD, gate contacts GS, door lock contacts DLC, contacts ST2, coil of switch T, contacts UX3, limit switch UL1, contacts D5 and the coils of switches U and C.

Switch T upon operation separates contacts T1, which prevents the operation of levelling relay L. It also engages contacts T3 completing a circuit through contacts AB2 for the coil of first brake control switch BA and through contacts AC2 for the coil of second brake control switch BB. Switch C upon operation separates contacts C3, which renders brushes CR, UHR and DHR ineffective during operation of the car, brush DHR, as previously pointed out, being rendered ineffective for up car travel by contacts XU1. Switch U upon operation engages contacts U3 rendering brushes CBU and UHB effective for up car travel. It also separates interlock contacts U4 in the circuit for the coil of relay XD and interlock contacts U6 in the circuit for the coil of down direction switch D. It also engages contacts U8 which completes a circuit through contacts R3 for the coil of a motion device MD.

Engagement of contacts U8 together with the engagement of contacts C6 completes a circuit through contacts BR2 for one coil of brake BR. Also contacts T4 complete a circuit through contacts BR1 and resistances RTB1, RTB2 and RTB3 for the other coil of the brake, contacts BA2 and BB2 being separated. The brake release coils act cumulatively to release the brake. As the brake releases it separates contacts BR1 to deenergize the upper release coil and separate contacts BR2 to insert cooling resistance in circuit with the lower coil. At the same time contacts C1, C2, U1 and U2 complete a circuit for the stator windings EMS of the elevator hoisting motor, contacts U1 and U2 establishing a phase rotation of the applied voltage for upward car travel. Thus, at the same time the brake is released current is supplied to the elevator hoisting motor to start the car in the up direction. As to whether the car starts at this time is dependent upon the load on the motor. If the load is below a predetermined amount the car starts, whereas if it is above this amount it will not start until a certain amount of torque controlling resistance RTM in circuit with the elevator motor stator windings has been short-circuited, this amount, in turn, depending upon the load on the motor.

The short-circuiting of the torque controlling resistance is effected by the accelerating switches. Contacts AA1 of the first accelerating switch short-circuit a portion of resistance RTM1, contacts AB1 of the second accelerating switch short-circuit resistance RTM3, contacts AC1 of the third accelerating switch short-circuit resistance RTM2 and contacts AD1 of the fourth accelerating switch short-circuit the remainder of resistance RTM1. The circuits for the coils of the accelerating switches are through electronic tubes ET. These tubes are preferably of the cold cathode trigger type and have been so indicated. In the case of tube ET1 in circuit with the coil of first accelerating switch AA, the anode is designated AN1, the cathode CD1 and the trigger or grid TG1. In each case a condenser is connected across the grid and cathode and resistance is provided in circuit with the condenser to time the firing of the tube. In the case of the circuit for tube ET1 the condenser is designated CA9 while the resistance is designated RT39 and RT40, these resistances being arranged in two sections, one of which is adjustable. The resistance delays the charging of the condenser and thus the building up of the voltage across the grid-cathode of the tube. Upon this voltage reaching a certain value the tube fires causing operation of the accelerating switch to short-circuit a step of torque controlling resistance.

In the case of switches AA, AB and AC sequence contacts are provided to control their operation. Contacts U8 and L2 are common to the circuit of the coils of these switches, the engagement of contacts U8 completing the circuit for the coil of switch AA. Upon the expiration of the time interval for tube ET1 after the completion of this circuit, switch AA operates to engage contacts AA2 completing a circuit for the coil of switch AB. Upon the expiration of the time interval for tube ET2, switch AB operates to engage contacts AB3 completing the circuit for the coil of switch AC. The value of resistance in circuit with condenser CA6 for tube ET4 is chosen so that the time interval of switch AD is such as to cause the operation of this switch after the operation of switch AC, the circuit for the coil of switch AD being established through contacts T3 at the same time that the circuit is established by contacts U8 for the coil of switch AA. However, sequence contacts may be provided on switch AC to control switch AD if desired and the circuit for switch AD timed accordingly. In this way the accelerating switches are timed in operation to short-circuit the resistance in circuit with the stator windings of the elevator hoisting motor to gradually increase the torque of this motor for the starting operation and after the car starts to bring it up to its running speed.

The values of torque controlling resistances are chosen so that the hoisting motor will start the car in the up direction with full load when the third accelerating switch AC operates to short-circuit resistance RTM2. With load below this amount the car will start before switch AC operates, the time of starting depending upon the load. As soon as the car starts and moves a certain distance contacts MDU of the motion device separate which, inasmuch as the contacts U7 are separated, breaks the circuit for the coil of motion relay R. Relay R in dropping out reengages contacts R2 in a circuit common to the holding circuits of the coils of brake control relays BA and BB. In the operation of the accelerating switches, switch AB separates contacts AB2 in the circuit for the coil of brake control switch BA and switch AC separates contacts AC2 in the circuit for brake control relay BB. If the car has not started and moved a sufficient distance to open contacts MDU by the time contacts AB2 separate, the separation of contacts AB2 deenergizes the coil of switch BA. Similarly, if the car has not started and moved a sufficient distance to open contacts MDU by the time contacts AC2 separate, the separation of contacts AC2 deenergizes the coil of switch BB. In other words, the car must not only start upon operation of switch U, switch AA or switch AB, but must move a sufficient distance within the time interval for the operation of the next switch to open contacts MDU, thereby measuring distance moved in relation to time to provide an accurate measurement of load. Should the car have started and opened contacts MDU before contacts AC2 separate, the engagement of contacts R2 completes a holding circuit through contacts BB1 for the coil of switch BB, maintaining this switch operated after the separation of contacts AC2. Similarly, should the car have started and opened contacts MDU before the separation of contacts AB2, the engagement of contacts R2 completes a holding circuit through contacts BA1 for the coil of switch BA so that switch BA remains operated upon separation of contacts AB2. Should switch BB be deenergized in the starting operation contacts BB2 reengage to short-circuit resistance RTB3 in circuit with the upper release coil of the brake. Similarly, should switch BA be deenergized in the starting operation its contacts BA2 engage to short-circuit resistance RTB2 in circuit with the upper release coil of the brake. This is for controlling the braking force exerted in the next stopping operation.

Relay R upon dropping out, also separates contacts R3 to deenergize the coil of motion device MD. As soon as this takes place, contacts MDU reengage to reestablish the circuit through contacts D7 and resistance RT27 for the coil of motion relay R. However, contacts T2 are separated at this time so that resistance RT28 is included in this circuit. The value of this resistance is such as to prevent the reoperation of the motion relay.

Each of the accelerating switches upon operation engages contacts to establish a self-holding circuit. Switch AA engages contacts AA3 establishing a holding circuit through resistance RT41. Switch AB engages contacts AB4 establishing a holding circuit through resistance RT38. Switch AC engages contacts AC3 establishing a holding circuit through resistance RT35. Switch AD engages contacts AD4 establishing a holding circuit through resistance RT32. The value of each of these resistances is such that the voltage across the anode-cathode circuit of the corresponding tube is reduced to a point which causes the tube to cease conducting current. Thus, each tube is energized only for an instant thereby providing maximum life for the tube in the control circuit.

The car being started, it moves in the up direction toward the third floor. As it approaches this floor, brush UHB engages contact UHC3. This completes the reset circuit for the coil of the up third floor relay 3UH. This circuit is from point RP of the rectifier, connected through the transformer to phase I, through the floor relay coil, contacts 3UH2, contacts UHC3, brush UHB, resistance RT8, contacts U3, reset coil of stopping relay ST, resistance R10 to the negative side of the rectifier. It will be noted that the direction of current flow through the coil by this circuit is opposite to that due to the pressing of the up third floor hall button UH3, the latter circuit extending from the positive side of the rectifier through the coil to point RP. Thus, the direction of current flow through the coil of the up third floor relay established by brush UHB is in a direction to oppose the residual magnetism of the floor relay, causing this relay to drop out. Also, the reset coil of relay ST acts to oppose the residual magnetism of this relay, causing it to drop out. The number of turns of the reset coil of relay ST is such as to insure the resetting of the stopping relay before the up third floor relay is reset.

At the same time that brush UHB engages contacts UHC3 the upper cam section 23 engages and opens the third floor direction switch DR3, breaking the circuit for the coils of relays XU and XUD. Separation of contacts ST1 and XUD4 as a result of the dropping out of relays ST and XUD respectively is without effect as these contacts are by-passed by contacts AD3 of the fourth accelerating switch. Also, the separation of contacts XU3 as a result of the dropping out of relay XU is without effect as these contacts are by-passed by contacts U5. The separation of contacts ST2, however, renders the coils of switches T, U and C subject to stopping switch SS on the floor controller.

As the car arrives at stopping distance from the third floor, stopping switch SS opens breaking the circuit for the coils of switches T, U and C. Switch T does not drop out immediately being delayed by the discharge of condenser CA5 connected through resistance RT26 across its coils. Switches U and C however drop out immediately, separating contacts U1, U2, C1 and C2 to break the circuit for the stator windings EMS of the elevator hoisting motor. At the same time contacts U8 separate breaking the circuit for the coils of accelerating switches AA, AB and AC. Also contacts U8 and C6 break the circuit for the lower release coil of the brake. As soon as the brake starts to apply, its contacts BR1 reengage completing a circuit for the upper release coil of the brake through an amount of resistance determined by the condition of the brake control switches BA and BB.

The condition of switches BA and BB as above explained is determined by the number of accelerating switches which have operated at the instant contacts MDU are opened by movement of the car. Since the torque required to start the motor is determined by the load on the motor and since the torque is dependent upon the current supplied to the motor and thus the resistance in circuit with the motor, the number of accelerating switches which operate before contacts MDU open and thus the condition of switches BA and BB is determined by the load on the motor. Under the conditions assumed in which the empty car is started in the up direction from the first floor, the car starts immediately the circuit for the hoisting motor is established so that switches BA and BB establish holding circuits to maintain contacts BA2 and BB2 separated. Thus the full amount of resistances RTB1, RTB2 and RTB3 is in circuit with the upper release coil of the brake and the upper coil exerts but a small force tending to oppose the brake springs so that a strong braking action is had. Inasmuch as the counterweight is overhauling under the assumed conditions, the strong force exerted by the brake opposes the action of the counterweight to bring the car to a stop within the dead zone, i. e., within a fraction of an inch of the floor.

Should there have been passengers in the car whose weight is above a certain amount, switch AB would operate before contacts MDU would be opened, so that switch BA would be dropped out. Thus, contacts BA2 would be engaged short-circuiting resistance RTB2 so that the braking force would not be so strong. With full load, the car would not start until operation of switch AC so that both switches BA and BB would be dropped out and a weak braking force would be exerted.

Should the car not be brought to a stop within the dead zone, as for example due to lack of uniform operating conditions or misadjustment, the levelling mechanism takes control to bring the car to the floor. Assume that in the above example the car stopped below the dead zone for the third floor. Upon the expiration of a time interval after opening of switch SS which is sufficient to enable the car to be brought to a stop, switch T drops out separating contacts T4 and T3 and engaging contacts T2 and T1. The separation of contacts T4 breaks the circuit for the upper release coil of the brake. The separation of contacts T3 deenergizes the coils of switches BA, BB and AD causing these switches to drop out. Switch AD in dropping out separates contacts AD3 breaking the circuit for the coil of gate close switch GC. Switch GC does not drop out immediately, however, being delayed by the discharge of condenser CA3 connected through resistances RT23 and RT22 across the coil of the switch.

The reengagement of contacts T2 completes a circuit for the coil of motion relay R which operates to engage contacts R1 to complete a circuit through contacts T1 and levelling switches DLV2 and ULV1 for the coils of levelling relay L and switches U and C. Switch U reoperates engaging contacts U8 to complete the circuit of the coil for the motion device and also to prepare the circuit through contacts R4 for the coils of the first three accelerating switches. Also, contacts U8 along with contacts C6 complete a circuit for the lower coil of the brake to release the brake while at the same time contacts U1, U2, C1 and C2 reestablish the circuit for the stator windings of the elevator hoisting motor for restarting the car in the up direction. Engagement of contacts C4 connects condenser CA2 parallel with condenser CA3 across the coil of gate close switch GC, condenser CA2 having been charged by the previous engagement of contacts C4 and thus adding to the delay in the dropping out of switch GC sufficient to enable the levelling of the car to be effected before switch GC drops out.

As before, as to whether the car starts at this time is dependent upon the load on the elevator hoisting motor. Thus, if the car does not start upon operation of switches U and C, torque controlling resistance in circuit with the stator winding is short-circuited in steps by accelerating switches until the car starts. Only the first three accelerating switches are utilized for this purpose and as soon as the car starts and moves sufficiently to open motion device contacts MDU, the operation of further accelerating switches, in the event that all of these three have not operated, is prevented. The opening of contacts MDU acts as before to break the circuit for the coil of motion relay R. The resultant separation of contacts R4 breaks the energizing circuits for the accelerating switches owing to the fact that contacts L2 are separated. Those accelerating switches which have operated are maintained operated through their holding contacts. Those accelerating switches which have not operated, however, cannot operate as their energizing circuit is broken. With this arrangement the torque exerted for the levelling operation is only sufficient to cause the car to start and accelerate at a low rate so that the speed of the car upon reaching the dead zone, will not be such as to cause the car to overrun the landing as might be the case if accelerating switches were thereafter permitted to operate to increase the torque of the motor. The circuits for the coils of relay L and switches U and C is maintained through contacts C5 after the separation of contacts R1. The separation of contacts R3 breaks the circuit for the coil of the motion device MD. As a result, contacts MDU reengage to reestablish the circuit for the coil of motion relay R. However, contacts L1 are separated at this time so that resistance R28 is included in this circuit preventing the reoperation of the motion relay.

As the car arrives in the dead zone, levelling switch ULV1 is opened breaking the circuit for the coils of relay L and switches U and C. Relay L does not drop out immediately, being delayed by the discharge of condenser CA4 connected across its coil through resistance RT25. Switches U and C drop out immediately, however, breaking the circuit for the stator windings of the hoisting motor and deenergizing the lower coil of the brake, applying the brake to bring the car to a stop. It is to be noted that in the levelling operation the upper release coil of the brake is not effective so that a hard application of the brake is obtained to bring the car to an immediate stop within the dead zone.

Should the car have overrun the floor, a similar operation takes place, except that down direction switch D is operated instead of switch U upon reengagement of contacts R1. The reengagement of contacts T2 after the stop is made completes a circuit for the coil of the motion relay R, which operates to engage contacts R1. This completes a circuit through contacts T1 and levelling switches ULV2 and DLV1 for the coils of levelling relay L and switches D and C. Switch D engages contacts D8 to complete the circuit for the coil of the motion device MD and also to prepare the circuit through contacts R4 for the coils of the first three accelerating switches. Also contacts D8 along with contacts C6 complete a circuit for the lower coil of the brake to release the brake. At the same time contacts D1, D2, C1 and C2 establish a circuit for the stator windings of the elevator hoisting motor. Contacts D1 and D2 reverse the phase rotation of the voltage applied to the motor so that the motor is energized to start the car in the down direction. As in the case of the levelling operation to bring the car from below the floor up to the floor, the direction switch and first three accelerating switches operate in timed sequence until the car starts and opens motion device contacts MDD. As soon as contacts MDD open the circuit for motion relay R is broken, contacts D7 being separated. As a result contacts R4 separate so that those of the first three accelerating switches which have not operated are prevented from operating. As in the case of an underrun, therefore, only enough torque is provided to bring the car at a low rate of acceleration to the landing level.

As the car arrives in the dead zone, levelling switch DLV1 is opened breaking the circuit for the coils of switches D and C. These switches drop out to break the circuit for the stator windings of the hoisting motor and to deenergize the brake. The brake is applied to bring the car to a stop at the landing.

As previously pointed out upon the expiration of its time interval after the opening of stopping switch SS in initiating stopping of the car, switch T drops out separating contacts T3 to deenergize fourth accelerating switch AD, resulting in the separation of contacts AD3 in the circuit for the coil of gate close switch GC. Switch GC is delayed in dropping out by the discharge of condenser CA3 into the coil of the switch. In this way a time interval is provided in which to determine whether or not the levelling mechanism is to be brought into operation. If the stopping is substantially level with the landing the levelling mechanism does not operate so that upon the expiration of the time interval switch GC drops out engaging contacts GC3 to complete the circuit for the coil of gate opening switch GO. Switch GO upon operation separates contacts GO3 in the circuit for the coil of switch GC. It also engages contacts GO1 and GO2 establishing circuits through portions of resistances RTG1 and RTG2 for the stator windings GMS of the gate operating motor. The phase rotation of the voltage thus applied is such as to cause the motor to open the gate. As the gate starts to open, the retiring cam falls into position to effect the unlocking of the third floor hatchway door and the separation of door lock contacts DLC3. As the gate reaches open position gate open limit switches GOL1 and GOL2 open. The opening of GOL2 breaks the circuit for the coil of gate open switch GO, which drops out to separate contacts GO1 and GO2 breaking the circuit for the gate operating motor. The opening of switch GOL1 breaks the circuit for the coil of hall time switch NT, this switch being delayed in dropping out by the discharge of condenser CA1 connected through resistance RT19 across its coil.

Should the levelling mechanism come into operation to bring the car to the floor level, switch C in operating engages contacts C4 to reconnect charged condenser CA2 parallel with condenser CA3 across the coil of the gate close switch GC. This adds to the delay in the dropping out of switch GC, this added time being sufficient to enable the levelling operation to be effected. Upon the completion of the levelling operation, switch C drops out to separate contacts C4 which disconnects condenser CA2 from across the coil of the gate close switch. The gate close switch thereupon drops out immediately to initiate the gate opening operation. However, should the car for any reason, such as some misadjustment, not be brought to the floor level within this added time interval, the gate close switch drops out as the time interval expires. This starts the gate opening operation and as soon as the gate starts to open, gate contacts GS open, breaking the circuit for the coils of switches U and C to cause the car to be brought to a stop in whatever position it may be.

As the gate reaches open position, gate open limit switches GOL1 and GOL2 open. The opening of limit switch GOL2 deenergizes the coil of gate open switch GO which drops out to deenergize the gate operating motor. The opening of limit switch GOL1 breaks the circuit for the coil of hall time switch NT. This switch does not drop out immediately, being delayed by the discharge of condenser CA1 through resistance RT19 into its coil. This provides time for the intending passenger to open the door and enter the car. Upon the passenger opening the door, door contacts DC3 separate deenergizing the coil of door contact switch DW. This switch drops out to engage contacts DW1 by-passing gate open limit switch GOL1 to reestablish the circuit for the coil of hall time switch NT. It also engages contacts DW2 to cause reoperation of stopping relay ST which latches in operated condition. Upon the passenger releasing the door, the door closes automatically reengaging door contacts DC3 to reestablish the circuit for the coil of switch DW. The resultant separation of contacts DW1 deenergizes the coil of switch NT which is delayed in dropping out as before by the discharge of condenser CA1. The time which elapses after the deenergization of switch NT before the switch fully opens permits the passenger to press a car button for his desired destination and thus determine the direction of car travel. As the intending passenger presses the up hall button at the third floor, he indicates an intention to travel in the up direction and would press the car button for the fourth floor. However, in order that the operation of the car in the down direction may be described, it will be assumed instead that he presses the car button for the first floor.

The pressing of car button C1 completes the circuit for the first floor car button relay IC, which operates to engage contacts IC1. This completes a circuit through first floor direction switch DR1, second floor direction switch DR2, cam section 24 and contacts XU2 for the coils of relays XD and XUD. Down direction switch relay XD separates interlock contacts XD1. It also separates contacts XD2 rendering brush UHR ineffective. It also engages contacts XD3 to prepare the circuit for the coil of down direction switch D. The engagement of contacts XUD4 as before completes the circuit for switch GC to cause the closing of the gate and locking of the hatchway door. This completes a circuit for the coils of stop time switch T, down direction switch D and potential switch C for starting the car in the down direction.

As in the case of upward car travel, the car starts as soon as sufficient torque has developed to start the car under the particular load conditions. The down direction switch and accelerating switches operate in timed sequence. As soon as the car starts and moves a certain distance, contacts MDD separate which, inasmuch as contacts D7 are separated, breaks the circuit for the coil of the motion relay R. Relay R drops out to separate contacts R2 in a circuit common to the holding circuits of the brake control switches. Thus only those of the brake control switches which are operated at this time remain in operated condition.

As the car approaches the first floor, brush CBD engages contacts CC1 completing the reset circuit for the coil of floor relay 1C, this circuit extending through resistance RT17, contacts D4, reset coil of relay ST and resistance RT10. As a result relay ST and the first floor car button relay are reset. At the same time the first floor direction switch runs from the lower section 24 to the upper section 23 of the direction cam breaking the circuit for the coils of relays XD and XUD. The separation of contacts ST2 renders the coils of switches T, C and D subject to stopping switch SS on the floor controller. As the car arrives at stopping distance from the first floor, switch SS opens to break the circuit for these coils. Switches D and C drop out to break the circuit for the stator windings of the hoisting motor and for the lower coil of the brake. As soon as the brake starts to apply, its contacts BR1 reengage to complete a circuit for the upper coil of the brake through an amount of resistance determined by the condition of brake control switches BA and BB. The brake is thus applied with a force predetermined by the load on the elevator hoisting motor to bring the car to a stop within the dead zone for the first floor. However, should the car come to a stop outside the dead zone, the levelling mechanism takes control as previously described to bring the car to the landing level. As in the case of levelling at the third floor landing above described, only so much of the torque control resistance is short-circuited to enable the car to accelerate at a low rate so that it will be running at a slow speed at the time the brake is applied to bring the car to a stop. When the car comes to a stop in the dead zone the gate open switch is energized to effect the unlocking of the hatchway door and the opening of the gate.

Assume that an intending passenger at the second floor pressed the down second floor hall button DH2 after the car, on its trip to the first floor, passed the second floor landing. This does not immediately establish a circuit for the up direction switch relay as the car is brought to a stop at the first floor, owing to the fact that contacts NT1 of the hall time switch are separated. As the passenger leaves the car at the first floor and the first floor hatchway door is reclosed to effect the operation of door contact switch DW, switch NT is deenergized by the separation of contacts DW1. Upon the expiration of the time interval for which switch NT is set contacts NT1 engage completing a circuit through contacts 2DH1 of the operated down second floor relay, direction switches DR2, DR3 and DR4, contacts XD1 and D3 for the coils of relays XU and XUD. These relays operate to cause the closing of the car gate and locking of the first floor hatchway door and the starting of the car in the up direction as previously described, stopping relay ST having been latched in operated condition as the result of the engagement of contacts DW2 in the opening of the first floor hatchway door.

Assuming no other button is pressed, upon the approach of the car to the second floor landing, up cam section 23 opens the second floor direction switch DR2 to break the circuit for the coils of relays XU and XUD. The resultant engagement of contacts XUD2 completes a circuit through contacts AD2 and resistances RT18 and RT10 for the reset coil of stopping relay ST causing this relay to be reset. This places the circuits for the coils of switches T, U and C under the control of floor controller stopping switch SS. Thus, as the car arrives at stopping distance from the second floor, switch SS opens breaking the circuits for the coils of switches T, U and C, causing the car to be brought to a stop at the second floor landing. The reengagement of contacts XU1 and C3 renders down brush DHR effective so that as the car arrives at the second floor landing, engagement of this brush with contact DHC2 completes the reset circuit for the coil of the down second floor relay, causing this relay to be reset.

It is believed to be understood without further detailed description that response is had to all push buttons regardless of the time order in which the push buttons are pressed, since the contacts of the floor relays, once in engagement, are maintained so until reset by reset operations. Stops are made in the natural order of floors, even though buttons are pressed out of said order. Car buttons cause the stopping of the car regardless of whether it is travelling in the up direction or down direction. As regards hall buttons, however, during up car travel the car stops in response to all up hall buttons and also in response to a down hall button provided no buttons remain unresponded to for floors above the floor at which this down hall button is located. Similarly, during down car travel, the car stops in response to all down hall buttons and also in response to an up hall button provided no buttons remain unresponded to for floors below the floor at which the up hall button is located.

The car is automatically started after each stop so long as push buttons remain to be responded to. The direction switch relays XU and XD act to maintain the car set for travel in the same direction after each stop so long as push buttons in that direction remain to be responded to at the time call is picked up. Resistances RT5 and RT16 act to prevent loss of direction in case the car is returned to a floor from an overrun under conditions where calls in the direction in which the car approached the floor remain to be responded to. When calls for floors in the direction in which the car is set for travel remain to be responded to after a stop has been made, the car gate is closed immediately the hatchway door is closed without waiting on the time interval of switch NT, and the car is started as the gate reaches closed position. Similarly, upon a passenger entering the car upon the last drop in either direction and pressing a car button, with the hatchway door closed, the car gate is closed immediately and the car is started as the gate reaches closed position. In case of starting the car in response to a hall button after the last stop of the car in either direction, however, the car gate is not closed and the car is not started until the time interval of switch NT has expired, owing to the fact that the direction circuit through the hall button floor relay contacts, being subject to contacts NT1, cannot be made until contacts NT1 reenegage. Contacts NT2 in circuit with the operating coil of stopping relay ST prevents the immediate reclosure of the gate in starting the car under conditions where buttons remain to be responded to to allow time for the hatchway door to be opened. Contacts XUD3 prevent the operating coil of relay ST standing on the line after the last call has been responded to and the door closed.

The elevator control system above described has been chosen as a convenient one to illustrate the principles of the invention. By way of the review of the operation of the system illustrated, to start and accelerate the car, voltage is applied to the hoisting motor and resistance in circuit with the hoisting motor stator windings is short circuited in steps by timed accelerating switches to gradually increase the torque of the motor. The time that the car starts during this period is dependent upon the load on the motor. The load is measured by the number of accelerating switches which have operated by the time the car has moved a certain distance in starting. The application of the mechanical brake on the next stop of the car is controlled in accordance with the load measurement thus obtained to cause the car to be brought to a stop substantially level with the landing. In making the stop, power to the hoisting motor is discontinued at a fixed distance from the landing and the brake is applied. An auxiliary coil on the brake is energized when the brake is applied, the amount of this energization being determined by the load measurement obtained. The greater the net load on the motor, the greater the energization of the auxiliary coil and thus the lower the braking force exerted.

With the proper number of steps of control and with proper adjustments, the accuracy of stops under various load conditions is satisfactory for many installations. However, to insure stops within close limits, levelling mechanism is provided to correct the stop in case it is made outside these limits. In levelling, resistance in circuit with the motor is short-circuited until the car starts and moves a certain distance. No further resistance is short-circuited. Thus the acceleration of the car in levelling is effected at such low rate that by applying a relatively hard brake the car can be brought to a stop without overrun beyond the stopping limits.

When a stop is made, the hatchway door is unlocked and the car gate is opened automatically. A certain time interval is allowed after the circuits to the hoisting motor are broken before this operation is initiated to determine whether or not levelling will take place. If the levelling mechanism does come into operation, a further time interval is allowed for the levelling operation to be completed. As soon as the car has been levelled, the gate opening operation is initiated and the door unlocked, without waiting for the expiration of the time interval. Should the levelling not be completed within this interval, however, the gate opening operation is initiated and the door unlocked at the expiration of the interval and the car is brought to an intermediate stop in its then position.

In accelerating the car, the resistance in circuit with the hoisting motor stator winding is short-circuited in one phase at a time. This decreases the number of contacts on the accelerating switches. This is the preferred arrangement but other arrangements may be utilized. Also, although the brake control illustrated is preferred, it is to be understood that other arrangements may be provided. For example, only one release coil may be utilized for the brake although two coils provides a factor of safety as the auxiliary coil can be of a strength such that it cannot prevent stopping of the car even if fully energized. Also, discharge resistance may be utilized for the brake coil and controlled in accordance with load instead of series resistance, or the point at which the brake is applied may be varied in accordance with load.

Variations may be made in the control circuits. An exciter may be employed for certain of the control circuits instead of the rectifier. The motion device may be operated by other mechanism than the governor, as for example, by the floor controller. The invention is applicable to multispeed alternating current motors and to single phase as well as polyphase motors. Also the invention may be utilized in connection with direct current resistance control installations.

Although a collective control push button system has been described, it is to be understood that the invention is applicable to single call push button control systems. Also the invention is applicable to systems controlled in other ways, such as those in which the starting of the car is under the control of an attendant in the car with stopping controlled by passengers and intending passengers themselves, or those in which the starting and stopping are under the control of the car attendant either directly or with the stopping controlled automatically afer movement of the control switch in the car to a certain position.

While as pointed out above, the principles of operation of compensation for load may be utilized in certain systems without the levelling control, it is also to be understood that the levelling control may be utilized in systems in which load compensation is not employed in stopping or in which other forms of load compensation are utilized for stopping. Also other arrangements for load measurement and compensation may be utilized in conjunction with the levelling operation. In addition the load compensation may be provided in elevator systems in which automatic control of the closure means is not provided.

Thus it is apparent that many changes and many apparently widely different embodiments of the invention may be made without departing from the scope thereof and it is therefore intended that all matter contained in the above description or shown in the accompanying drawings shall be interpreted as illustrative and not in a limiting sense.

What is claimed is:

1. In combination; an elevator car adapted to serve a plurality of landings; a motor for raising and lowering the car; means for starting the car by increasing the torque of said motor in steps until the car starts and for thereafter bringing the car up to running speed; means for stopping the car at the landings; means operable in response to the starting of the car; and means for determining the load on said motor by the number of steps of torque increase which have taken place at the time said start responsive means operates in starting the car and for controlling in accordance with the load on said motor as thus determined the operation of said stopping means in stopping the car at the next landing at which a stop is to be made.

2. In combination; an elevator car adapted to serve a plurality of landings; a motor for raising and lowering the car; an electromechanical brake for said motor; means for starting the car by causing release of said brake and increase in the available torque of said motor in steps until the car starts and for thereafter bringing the car up to running speed; stopping means for causing deenergization of said motor and application of said brake as the car approaches the next landing at which a stop is to be made; switching mechanism operable by movement of the car in starting; and means for determining the load on said motor by the number of steps of increase of available torque which have taken place at the time said switching mechanism operates in starting the car for controlling the operation of said stopping means in accordance with the load on said motor as thus determined.

3. In combination; an elevator car adapted to serve a plurality of landings; a motor for raising and lowering the car; means for causing energization of said motor and thereafter increase in the available torque of said motor for starting the car and bringing it up to running speed; means for stopping the car at the landings including variable resistance for controlling the stopping; means operable in response to the starting of the car; and means for measuring the amount of available torque at the time said start responsive means operates in starting the car and for controlling in accordance with the measurement thus obtained the amount of said resistance which is effective in stopping the car at the next landing at which a stop is to be made.

4. In combination; an elevator car adapted to serve a plurality of landings; a motor for raising and lowering the car; an electromechanical brake for said motor; means for causing energization of said motor and release of said brake and thereafter increase in the available torque of said motor in steps for starting the car and bringing it up to running speed; means for causing deenergization of said motor and application of said brake as the car reaches a point a certain distance from the next landing at which a stop is to be made; switching mechanism responsive to movement of the car in starting; and means controlled by the number of steps of torque increase which had taken place at the time said switching mechanism operated in starting the car for causing the brake to be applied with a force determined by the number of such steps to bring the car to a stop substantilly level with said landing.

5. In combination; an elevator car adapted to serve a plurality of landings; a motor for raising and lowering the car; an electromechanical brake for said motor; means for causing energization of said motor and release of said brake; a plurality of accelerating switches operable in sequence for causing increase in the torque of said motor; means for causing deenergization of said motor and application of said brake as the care approaches the next landing at which a stop is to be made; switching mechanism responive to movement of the car in starting; and means controlled by the number of accelerating switches which were operated at the time said switching mechanism operated in starting the car for causing the brake to be applied with a force which is greater the less the number of accelerating switches which were operated at such time.

6. In combination; an elevator car adapted to serve a plurality of landings; a polyphase induction motor for raising and lowering the car; an electromechanical brake for said motor; means for causing energization of said motor and release of said brake; a plurality of accelerating switches operable in timed sequence for causing increase in the torque of said motor; control mechanism operable as the car arrives at a predetermined distance from the next landing at which a stop is to be made for causing deenergization of said motor and application of said brake; motion responsive switching mechanism operable upon movement of the car a certain distance after starting; and means controlled by the number of accelerating switches which were operated at the time said motion responsive switching mechanism operated in starting the car for causing the brake to be applied with a force which is greater the less the number of accelerating switches which were operated at such time, thereby causing the car to be brought to a stop substantially level with said landing.

7. In combination; an elevator car adapted to serve a plurality of landings; a polyphase induction motor for raising and lowering the car; a source of alternating current for said motor; resistance for said motor; an electromechanical brake for said motor, said brake having a main coil and an auxiliary coil; a source of direct current for said brake coils; means for starting the car including switching means for connecting said main coil of said brake to its source to release said brake, switching means for connecting said motor to its source with its resistance in series with its stator windings, and a plurality of accelerating switches operable in timed sequence to short-circuit said resistance in steps; motion responsive switching mechanism operable upon movement of the car a certain distance after starting; control mechanism operable as the car arrives at a predetermined distance from the next landing at which a stop is to be made for causing disconnection of said motor from its source and disconnection of said main brake coil from its source and the connection of said auxiliary brake coil thereto; and means controlled by the number of accelerating switches which were operated at the time said motion responsive switching mechanism operated in starting the car for causing the strength of said auxiliary brake coil to be greater the greater the number of accelerating switches which where operated at such time, thereby causing a braking force to be exerted to bring the car to a stop substantially level with said landing.

8. In combination; an elevator car adapted to serve a plurality of landings; a three phase induction motor for raising and lowering the car; a source of three phase alernating current for said motor; resistance for said motor; an electromechanical brake for said motor, said brake having a main coil and an auxiliary coil; a source of direct current for said brake coils; resistance for said auxiliary coil; means for starting the car incluiding switching means for connecting said main coil of said brake to its source to release said brake, switching means for connecting said motor to its source with its resistance in series with its stator windings, and a plurality of accelerating switches operable in timed sequence to short-circuit such resistance in steps; motion responsive switching mechanism operable upon movement of the car a certain distance after starting; control mechanism operable as the car arrives at a predetermined distance from the next landing at which a stop is to be made for causing disconnection of said motor from its source and disconnection of said main brake coil from its source and the connection of said auxiliary brake coil thereto with its resistance in series therewith; means controlled by the number of accelerating switches which were operated at the time said motion responsive switching mechanism operated in starting the car for causing the amount of such resistance in series with said auxiliary brake coil to be less the greater the number of accelerating switches which were operated at such time, thereby causing a braking force to be exerted to bring the car to a stop substantially level with said landing; and means for disconnecting said auxiliary brake coil from its source upon the expiration of a time interval after the disconnection of said motor from its source sufficient to enable the car to be brought to a stop.

9. In combination; an elevator car adapted to serve a plurality of landings; a three phase induction motor for raising and lowering the car; a source of three phase alternating current for said motor; resistance for said motor; an electromechanical brake for said motor, said brake having a main coil and an auxiliary coil; a source of direct current for said brake coils, resistance for said auxiliary coil; switching means for connecting said main coil of said brake to its source to release said brake, for connecting said motor to its source with its resistance in series with its stator windings and for short-circuiting said resistance to start and accelerate the car, said switching means including a plurality of accelerating switches operating in timed sequence for effecting the short-circuiting of such resistance in steps; a plurality of brake control switches for controlling the amount of resistance for said auxiliary brake coil, said brake control switches being controlled by certain of said accelerating switches; a motion device responsive to the starting of the car and movement thereof a certain distance for preventing further control of said brake control switches by said accelerating switches, said brake control switches which are operated at the instant said car has moved said certain distance remaining in operated condition until said car is brought to a stop thereby setting said brake control switches in accordance with the load on said motor; switching mechanism operable as the car arrives at a predetermined distance from the next landing at which a stop is to be made for causing disconnection of said motor from its source and disconnection of said main brake coil from its source and the connection of said auxiliary brake coil thereto with an amount of its resistance in series therewith determined by said brake control switches that are in operated condition thereby causing a braking force to be exerted to bring the car to a stop substantially level with said landing; and means for disconnecting said auxiliary brake coil from its source upon the expiration of a time interval after the disconnection of said motor from its source sufficient to enable the car to be brought to a stop.

10. In combination; an elevator car adapted to serve a plurality of landings; a motor for raising and lowering the car; means for causing energization of said motor and thereafter increase in the available torque of said motor for starting the car and bringing it up to running speed; means for stopping the car at the landings; a motion device operable upon movement of the car a certain distance; means controlled in accordance with the amount of available torque at the time said motion device operated in starting the car for controlling the operation of said stopping means in stopping the car at the next landing at which a stop is to be made; levelling mechanism operable in case the car underruns or overruns the landing in stopping for causing the energization of said motor for operation to bring the car to the landing level; and means for causing increase in the torque of said motor after energization of the motor for levelling until the car starts and moves said certain distance, said motion device acting upon such movement to prevent further increase in the available torque of said motor.

11. In combination; an elevator car adapted to serve a plurality of landings; a motor for raising and lowering the car; an electromechanical brake for said motor; means for causing energization of said motor and release of said brake and thereafter increase in the available torque of said motor for starting the car and bringing it up to running speed; means for causing deenergization of said motor and application of said brake for stopping the car at the landings; a motion device operable upon movement of the car a certain distance in starting; means controlled in accordance with the amount of available torque at the time said motion device operated in starting the car for controlling the force with which the brake is applied in stopping the car at the next landing at which a stop is to be made; levelling mechanism operable in case the car underruns or overruns the landing in stopping for causing the energization of said motor and release of said brake for operation to bring the car to the landing level; means for causing increase in the torque of said motor after energization of the motor for levelling until the car starts and moves said certain distance, said motion device acting upon such movement to prevent further increase in the available torque of said motor, said levelling mechanism acting to cause deenergization of said motor and application of said brake as the car reaches the landing level; and means for causing the brake to be fully applied upon application thereof to bring the car to a stop after the levelling operation.

12. In combination; an elevator car adapted to serve a plurality of landings; a motor for raising and lowering the car; an electromechanical brake for said motor; means for causing energization of said motor and release of said brake; a plurality of accelerating switches operable in sequence for causing increase in the available torque of said motor after energization thereof; means for causing deenergization of said motor and the application of said brake as the car arrives at a predetermined distance from the next landing at which a stop is to be made; a motion device operable upon movement of the car a certain distance after starting; means controlled by the number of accelerating switches which were operated at the time said motion device operated in starting for causing the force with which the brake is applied in making said stop to be greater the less the number of accelerating switches which were operated at such time; levelling mechanism operable in case the car underruns or overruns the landing in making the stop for causing the energization of said motor and release of said brake to bring the car to the landing level, said accelerating switches being operable to cause increase in the torque of said motor for levelling; means responsive to the operation of said motion device upon movement of the car said certain distance in starting to level to prevent operation of said accelerating switches which have not operated at such time; and means controlled by said levelling mechanism as the car reaches said landing for causing deenergization of said motor and the full application of said brake.

13. In combination; an elevator car adapted to serve a plurality of landings; a motor for raising and lowering the car; means for controlling the operation of said motor to start the car and stop it at the landings; levelling mechanism operable in case the car underruns or overruns a landing in stopping for causing the energization of said motor for operation to bring the car to the landing level; and means for causing increase in the available torque of said motor upon energization thereof for levelling only until the car starts and moves a certain distance.

14. In combination; an elevator car adapted to serve a plurality of landings; a motor for raising and lowering the car; means for controlling the operation of said motor to start the car and stop it at the landings; levelling mechanism operable in case the car underruns or overruns a landing in stopping for causing the energization of said motor for operation to bring the car to the landing level; and means operable in case said motor does not start and move the car a certain distance within a certain time interval after energization thereof for levelling for causing increase in the available torque of said motor only until the car moves said certain distance.

15. In combination; an elevator car adapted to serve a plurality of landings; a motor for raising and lowering the car; means for controlling the operation of said motor to start the car and stop it at the landings; levelling mechanism operable in case the car underruns or overruns a landing in stopping for causing the energization of said motor for operation to bring the car to the landing level; means operable in case said motor does not start upon energization thereof for levelling for causing increase in the torque of said motor until movement of the car takes place; and means responsive to movement of the car for preventing further operation of said torque increasing means.

16. In combination; an elevator car adapted to serve a plurality of landings; a motor for raising and lowering the car; means for controlling the operation of said motor to start the car and stop it at the landings; levelling mechanism operable in case the car underruns or overruns a landing in stopping for causing the energization of said motor for operation to bring the car to the landing level; means operable in case said motor does not start upon energization thereof for levelling for causing increase in the available torque of said motor until the car starts and moves a certain distance; and switching mechanism responsive to movement of the car in levelling for preventing further operation of said torque increasing means after the car moves said certain distance.

17. In combination; an elevator car adapted to serve a plurality of landings; a motor for raising and lowering the car; means for controlling the operation of said motor to start the car and stop it at the landings; levelling mechanism operable in case the car underruns or overruns a landing in stopping for causing the energization of said motor for operation to bring the car to the landing level; means operable after the energization of said motor for levelling for causing increase in the torque of said motor; and switching mechanism responsive to movement of the car in levelling for preventing further operation of said torque increasing means.

18. In combination; an elevator car adapted to serve a plurality of landings; a polyphase induction motor for raising and lowering the car; a source of current for said motor; means for controlling the operation of said motor to start the car and stop it at the landings; levelling mechanism operable in case the car underruns or overruns a landing in stopping for causing the connection of said motor to said source for operation to bring the car to the landing level; a plurality of switches operable in sequence after the connection of said motor to said source for levelling for causing increase in the torque of said motor; and switching mechanism responsive to a small initial movement of the car in levelling for preventing the operation of any of said switches which have not operated by the time such movement takes place.

19. In combination; an elevator car adapted to serve a plurality of landings; a three phase induction motor for raising and lowering the car; a source of three phase alternating current for said motor; means for controlling the operation of said motor to start the car and stop it at the landings; levelling mechanism operable in case the car underruns or overruns a landing in stopping for causing the connection of said motor to said source for operation to bring the car to the landing level; a plurality of accelerating switches operable in timed sequence after the connection of said motor to said source for levelling for causing increase in the torque of said motor; and switching mechanism operable upon movement of the car in starting the levelling operation for preventing the operation of any of said accelerating switches which have not already operated, thereby permitting the motor to develop only enough torque to bring the car to the landing level at a low rate of acceleration.

20. In combination; an elevator car adapted to serve a plurality of landings; a three phase induction motor for raising and lowering the car; a source of three phase alternating current for said motor; an electromechanical brake for said motor; means for controlling the operation of said motor and brake to start the car and stop it at the landings; resistance for said motor; levelling mechanism operable in case the car underruns or overruns a landing in stopping for causing the release of said brake and the connection of said motor to said course with said resistance in series with the stator windings; a plurality of switches operable in timed sequence after the connection of said motor to said source for levelling to short-circuit steps of said resistance; and motion responsive switching mechanism operable upon movement of the car a certain distance after the start of the levelling operation for preventing the operation of any of said switches which have not already operated, thereby permitting the motor to develop only enough torque to bring the car to the landing level at a low rate of acceleration, said levelling mechanism acting as the car reaches the landing level to cause the disconnection of said motor from said source and the application of said brake to bring the car to a stop.

21. In combination; an elevator car adapted to serve a plurality of landings; means operable as the car approaches a landing at which a stop is to be made to initiate stopping of the car; closure means adapted when open to afford access between the car and the landing at which the car is stopped; operating means for said closure means; levelling mechanism operable to cause the car to be brought to the landing level in case the car does not stop substantially level with the landing; means for causing operation of said operating means to open said closure means upon the expiration of a predetermined time interval after the initiation of said stopping operation; and means for delaying operation of said operating means for a further time interval in the event that said levelling mechanism comes into operation within said predetermined time interval.

22. In combination; an elevator car adapted to serve a plurality of landings; means operable as the car arrives at a predetermined distance from a landing at which a stop is to be made to initiate stopping of the car; closure means adapted when open to afford access between the car and the landing at which the car is stopped; operating means for said closure means; levelling mechanism operable to cause the car to be brought to the landing level in case the car does not stop substantially level with the landing; means for causing operation of said operating means to open said closure means upon the expiration of a predetermined time interval after the initiation of said stopping operation; means for delaying operation of said operating means for a further time interval in the event that said levelling mechanism comes into operation within said predetermined time interval; and means for causing operation of said operating means to open said closure means without waiting for the expiration of said further time interval in the event levelling operation is completed before said further time interval expires.

23. In combination; an elevator car adapted to serve a plurality of landings; means operable as the car arrives at a predetermined distance from a landing at which a stop is to be made to initiate stopping of the car; closure means adapted when open to afford access between the car and the landing at which the car is stopped; operating means for said closure means; levelling mechanism operable to cause the car to be brought to the landing level in case the car when brought to a stop has underrun or overrun the landing; means for causing operation of said operating means to open said closure means upon the expiration of a predetermined time interval after the initiation of said stopping operation; means for further delaying operation of said operating means to open said closure means in the event that said levelling mechanism comes into operation within said predetermined time interval; and means for causing operation of said operating means to open said closure means immediately upon completion of the levelling operation provided the levelling operation is completed within a certain additional time interval but for causing said operation of said operating means to open said closure means immediately upon expiration of said adidtional time interval in the event the levelling operation has not been completed at this time.

24. In combination; an elevator car adapted to serve a plurality of landings; a motor for raising and lowering said car; means for causing deenergization of said motor as the car arrives at a predetermined distance from a landing at which a stop is to be made to bring the car to a stop at said landing; a gate on said car; operating means for opening said gate; levelling mechanism for contiolling said motor to bring the car to the landing level in case the car when brought to a stop has underrun or overrun the landing; means for causing operation of said operating means to open said gate upon the expiration of a certain time interval after the deenergization of said motor in making the stop; means for further delaying operation of said operating means in the event that said levelling mechanism comes into operation within said certain time interval; means for causing operation of said operating means to open said gate immediately upon completion of the levelling operation provided the levelling operation is effected within a certain adidtional time interval but for causing said operation of said operating means to open said gate immediately upon expiration of said adidtional time interval in the event the levelling operation has not been completed at this time; and means for causing de-energization of said motor to bring the car to a stop upon initiation of the gate opening operation prior to the completion of the levelling operation.

25. In combination; an elevator car adapted to serve a plurality of landings; a hoisting motor for raising and lowering said car; a source of current for said hoisting motor; an electromechanical brake for said hoisting motor; means for disconnecting said hoisting motor from said source and applying said brake as the car arrives at a predetermined distance from a landing at which a stop is to be made to stop said car at said landing; a gate on said car; means including a motor carried by the car for opening said gate; levelling mechanism for controlling the operation of said hoisting motor and brake to bring the car to the landing level in case the car when brought to a stop has underrun or overrun the landing; means for causing operation of said opening means to open said gate upon the expiration of a time interval after the disconnection of said hoisting motor from said source in making the stop sufficient to determine whether or not said levelling mechanism will come into operation; means for delaying operation of said opening means for a further time interval sufficient to enable the levelling operation to be effected in the event that said levelling mechanism comes into operation; means for causing operation of said opening means to open said gate immediately the car has been brought to a stop level with the floor by said levelling mechanism in the event the levelling operation is effected before the expiration of said further time interval but for causing operation of said opening means to open said gate upon the expiration of said further time interval in the event the levelling operation has not been completed within said further time interval; and means responsive to the initiation of the gate opening operation under conditions where the levelling operation is not completed within said further time interval for disconnecting said hoisting motor from said source and applying said brake to bring the car to an immediate stop in whatever position it may be.

26. In combination; an elevator car adapted to serve a plurality of landings; a polyphase alternating current induction motor for raising and lowering the car; a source of alternating current for said motor; resistances for said motor; means for connecting said motor to said source with said resistances in series therewith to start the car; and means for short-circuiting said resistances, one phase at a time, to increase the available torque of said motor.

27. In combination; an elevator car adapted to serve a plurality of landings; three phase alternating current induction motor for raising and lowering the car; a source of alternating current for said motor; resistance for each phase of the stator windings of said motor; means for connecting said stator windings to said source with their respective resistances in series therewith to start the car; and accelerating switches operable in sequence to short-circuit said resistances in steps, one phase at a time, to increase the available torque of said motor.

JACOB DANIEL LEWIS.
WILLIAM HENRY BRUNS.